United States Patent
Phan et al.

(10) Patent No.: US 9,437,087 B2
(45) Date of Patent: Sep. 6, 2016

(54) METHOD AND SYSTEM FOR HAPTIC DATA ENCODING AND STREAMING USING A MULTIPLEXED DATA STREAM

(71) Applicant: IMMERSION CORPORATION, San Jose, CA (US)

(72) Inventors: Loc Phan, San Jose, CA (US); Satvir Singh Bhatia, San Jose, CA (US); Stephen D. Rank, San Jose, CA (US); Christopher J. Ullrich, Ventura, CA (US); Jean Francois Dionne, Montreal (CA); Hugues Antoine Oliver, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 78 days.

(21) Appl. No.: 14/286,591

(22) Filed: May 23, 2014

(65) Prior Publication Data
US 2014/0347177 A1    Nov. 27, 2014

Related U.S. Application Data

(60) Provisional application No. 61/827,341, filed on May 24, 2013, provisional application No. 61/874,920, filed on Sep. 6, 2013, provisional application No. 61/907,318, filed on Nov. 21, 2013.

(51) Int. Cl.
| | |
|---|---|
| *G08B 21/00* | (2006.01) |
| *G08B 6/00* | (2006.01) |
| *G06F 3/16* | (2006.01) |
| *G06F 3/01* | (2006.01) |
| *H04N 21/2343* | (2011.01) |
| *H04N 21/236* | (2011.01) |
| *H04N 21/6336* | (2011.01) |
| *H04N 21/658* | (2011.01) |
| *H04N 21/854* | (2011.01) |

(52) U.S. Cl.
CPC ................ *G08B 6/00* (2013.01); *G06F 3/016* (2013.01); *G06F 3/165* (2013.01); *H04N 21/23614* (2013.01); *H04N 21/234336* (2013.01); *H04N 21/6336* (2013.01); *H04N 21/6582* (2013.01); *H04N 21/85406* (2013.01)

(58) Field of Classification Search
CPC ........................................................ G08B 6/00
USPC .................. 340/407.1, 407.2, 691.1; 463/30
See application file for complete search history.

(56) References Cited

U.S. PATENT DOCUMENTS

2009/0096632 A1\* 4/2009 Ullrich et al. ............. 340/825.2
2012/0306631 A1    12/2012 Hughes

OTHER PUBLICATIONS

Extended European Search Report as issued in European Patent Application No. 14169721.9, dated Jul. 17, 2014.
"Transcoding," Wikipedia, revision dated Apr. 19, 2013, URL: <http://en.wikipedia.org/w/index.php?title-Transcoding &oldid=551075245> [retrieved on Jul. 9, 2014].

\* cited by examiner

*Primary Examiner* — Jeffery Hofsass
(74) *Attorney, Agent, or Firm* — Miles & Stockbridge P.C.

(57) ABSTRACT

A method includes receiving digital content data including audio data and/or video data, generating haptic data using at least some of the received digital content data, encoding the haptic data for efficient transmission over a communication network, multiplexing the encoded haptic data with the received digital content data, embedding information for decoding the encoded haptic data in metadata of the multiplexed data stream, and sending the multiplexed data stream over the communication network. The method may include analyzing the haptic data to determine at least one characteristic of the haptic data, and the encoding the haptic data may include encoding, based on the determined characteristic, the haptic data to meet a pre-defined criteria.

26 Claims, 16 Drawing Sheets

METHOD AND SYSTEM FOR HAPTIC DATA ENCODING AND STREAMING USING A MULTIPLEXED DATA STREAM

CROSS-REFERENCE TO RELATED APPLICATIONS

This application claims the benefit of priority to: U.S. Provisional Patent Application No. 61/827,341, filed May 24, 2013 and entitled "System and Method of Haptic Media Encoding," U.S. Provisional Patent Application No. 61/874,920, filed Sep. 6, 2013 and entitled "Haptic Content Creation, Distribution and Playback Solution," and U.S. Provisional Patent Application No. 61/907,318, filed Nov. 21, 2013 and entitled "Method and System for Haptic Data Encoding and Streaming," the contents of all of which are incorporated herein by reference in their entireties.

FIELD

The present invention is directed to systems and methods for encoding a haptic stream as part of digital content for storing and/or for transferring over a network.

BACKGROUND

With the increasing use of haptic effects to enhance a user's experience in a plethora of digital content applications, it is desirable to efficiently store and/or transmit haptic data together with other digital content (e.g., multimedia data) over a network. A haptic data stream is typically represented in raw pulse code modulation ("PCM") data format. To stream haptic data sampled in 8 bits at 8000 samples per second over a network (wired or wireless), 64 kbits (8 KB) per second, or an extra 8 KBps should be transferred on the bandwidth. However, there may be periods of silence in the stream, i.e. periods during which no haptic data is streamed, which may waste time and bandwidth by streaming zeroes or unnecessary data over the network, and is not ideal for both the content distributor and the end user. The storing of haptic data streams faces the same challenge.

With respect to digital content streaming, adaptive bit rate streaming is a common practice for varying the quality of audio/video signals when streaming or transmitting large amounts of data over a digital network. This is done so that the smooth streaming or playback of audio and video signals is still feasible by adapting to varying network speeds and/or congestion. For example, if a video is streaming at very high quality, and then the network over which it is streaming experiences heavy network congestion, or the download speed suddenly becomes slower, the streaming server can still transmit data, but will transmit lower quality data to conserve network bandwidth. Once the congestion has been mitigated and the network speed has increased, the data sent will be higher quality as network bandwidth is more freely available. This may be done by encoding data at multiple bit rates so that the amount of data to be transmitted is much less.

Haptic signals may be interpreted as audio signals if the signal is simply a waveform. However, simply treating haptic signals like audio signals and transcoding the haptic signal at multiple bit rates may not offer much room to adapt the quality for various network speeds. A high quality haptic signal may be considered to have a sample rate of 8 kHz, which is considered to be a very low sample rate for an audio signal and would be a low quality signal. By simply degrading the quality of the haptic signal, a completely different user experience may be introduced, and degrading the quality by just arbitrarily removing bits of the same stream may result in unintended texturing and take away from the clarity of the signal.

SUMMARY

It is desirable to provide haptic data encoding schemes that allow the haptic data to be stored and/or transferred over a network more efficiently.

According to an aspect of the invention, there is provided a method that includes receiving digital content data including audio data and/or video data; generating haptic data using at least some of the received digital content data; encoding the haptic data for efficient transmission over a communication network; multiplexing the encoded haptic data with the received digital content data; embedding information for decoding the encoded haptic data in metadata of the multiplexed data stream; and sending the multiplexed data stream over the communication network.

In an embodiment, the method may be a computer-implemented method for enriching user digital content experience with haptic data and may be implemented on a computing device having a processor programmed with a computer program module. The computer-implemented method may transfer the haptic data together with other digital content data over a communication network for an end user to experience the haptic effects generated on an end user device that is coupled to the network.

In an embodiment, the method includes analyzing the haptic data to determine at least one characteristic of the haptic data, and encoding the haptic data includes encoding, based on the determined characteristic, the haptic data to meet a pre-defined criteria.

In an embodiment, the pre-defined criteria includes an output encoded haptic bit stream having the least number of bits.

In an embodiment, the method includes receiving an endpoint configuration of an end user device from the end user device, and the pre-defined criteria includes preserving a range of frequency of the haptic data that correspond to the received endpoint configuration of the end user device.

In an embodiment, encoding the haptic data includes selecting an encoder from a list of pre-determined encoders based on the determined characteristic and applying the selected encoder to transform the haptic data.

In an embodiment, the list of pre-determined encoders includes an Advanced Audio Coding encoder and/or a Free Lossless Audio encoder.

In an embodiment, the characteristics of the haptic data comprise one or more types of haptic output devices used to generate haptic effects based on the haptic data, intended use case of the haptic data, magnitude of the haptic data, frequency of the haptic data, and length of the silence in the haptic data.

In an embodiment, the types of haptic output devices include one or more of the group consisting of an eccentric rotating mass actuator, a linear resonant actuator, and a piezoelectric actuator.

In an embodiment, the intended use case of the haptic data is selected from the group consisting of music, movies and games.

In an embodiment, encoding the haptic data includes applying each one of a list of pre-determined encoders to the haptic data to generate a corresponding list of encoded haptic data streams, and selecting, using the pre-defined criteria, an encoded haptic data stream from the list of encoded haptic data streams.

In an embodiment, encoding the haptic data includes encoding the haptic data for a predetermined list of density factors to generate a plurality of encoded haptic data streams, each encoded haptic data stream corresponding to a density factor of the predetermined list of density factors, and the method includes receiving network bandwidth information from an end user device over a communication network, and selecting one of the encoded haptic data streams based on a corresponding density factor matching a condition of the communication network bandwidth for multiplexing with the received digital content data.

In an embodiment, a first encoded data stream of the plurality of encoded data streams corresponds to a first density factor of the predetermined list of density factors, and a second encoded data stream of the plurality of encoded data streams corresponds to a second density factor of the predetermined list of density factors, and wherein the second encoded data stream comprises more haptic data than the first data stream and the second density factor is greater than the first density factor.

In an embodiment, the method includes detecting a change in the network bandwidth information, selecting a different one of the encoded haptic data streams based on the corresponding density factor matching the condition of the communication network bandwidth, and transmitting the selected different one of the encoded data streams to the end user device.

According to an aspect of the invention, there is provided a system that includes a processor configured to receive digital content data including audio data and/or video data, generate haptic data using at least some of the received digital content data, encode the haptic data for efficient transmission over a communication network, multiplex the encoded haptic data with the received digital content data, embed information for decoding the encoded haptic data in metadata of the multiplexed data stream. and send the multiplexed data stream over the communication network. The system includes a user device configured to receive the multiplexed encoded haptic data and digital contact data over the communication network. The user device includes a haptic output device configured to output a haptic effect based on the haptic data.

In an embodiment, the processor is further configured to analyze the haptic data to determine at least one characteristic of the haptic data, and encode the haptic data based on the determined characteristic to meet a pre-defined criteria.

In an embodiment, the processor is configured to receive an endpoint configuration of the user device from the user device, and the pre-defined criteria includes preserving a range of frequency of the haptic data that correspond to the received endpoint configuration of the end user device.

In an embodiment, the processor is configured to select an encoder from a list of pre-determined encoders based on the determined characteristic and apply the selected encoder to transform the haptic data.

In an embodiment, the processor is configured to apply each one of a list of pre-determined encoders to the haptic data to generate a corresponding list of encoded haptic data streams, and select, using the pre-defined criteria, an encoded haptic data stream from the list of encoded haptic data streams.

In an embodiment, the processor is configured to encode the haptic data for a predetermined list of density factors to generate a plurality of encoded haptic data streams, each encoded haptic data stream corresponding to a density factor of the predetermined list of density factors, receive network bandwidth information from an end user device over a communication network, and select one of the encoded haptic data streams based on a corresponding density factor matching a condition of the communication network bandwidth to multiplex with the received digital content data.

In an embodiment, the processor is configured to detect a change in the network bandwidth information, select a different one of the encoded haptic data streams based on the corresponding density factor matching the condition of the communication network bandwidth, and transmit the selected different one of the encoded data streams to the end user device.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION. OF THE DRAWINGS

DETAILED DESCRIPTION

Embodiments of the invention relate to systems and methods for generating, transferring and/or storing haptic data as part of digital content to enrich user experience when consuming the digital content. As used herein, "digital content" refers to information that can be transferred and stored at a non-transitory storage medium, and may include, for example, audio and/or video data. As such, digital content includes information encoded using various file formats and/or other un-encoded content that can be transferred and stored at a non-transitory storage medium.

Figure 1:
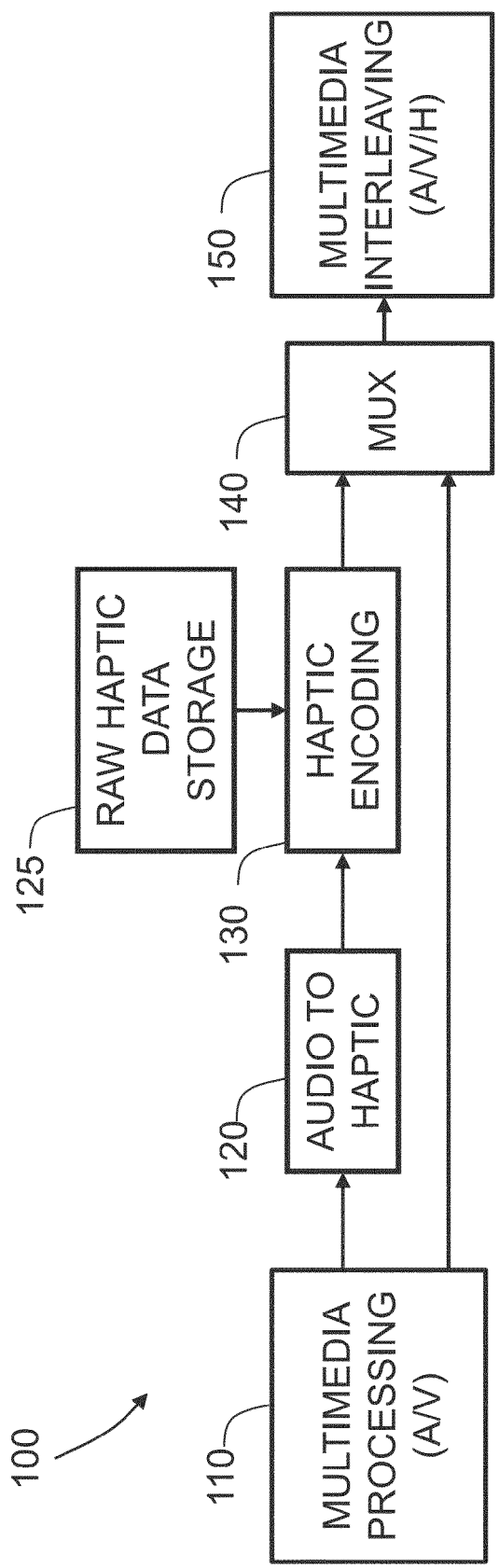
FIG. 1 illustrates an embodiment of a method for creating and encoding haptic data to be played with other multimedia data, either locally or remotely.

In an embodiment, it may be desirable to add haptic effect to the playback of multimedia data. FIG. 1 illustrates a method 100 for creating and encoding haptic data to be eventually played with other digital content, either locally or remotely, in accordance with an embodiment of the invention. As illustrated, the method 100 includes a source multimedia processing stage 110, an audio-to-haptic conversion stage 120, a haptic encoding stage 130, a multiplexing stage 140, and multimedia interleaving stage 150.

In an embodiment, haptic data may be created from the audio data of a multimedia data stream. The audio data may be extracted during the source multimedia processing stage 110, and converted to a raw haptic data stream, as explained in more detail below, during the audio-to-haptic conversion stage 120. The raw haptic data may be further encoded during the haptic encoding stage 130 so that less network bandwidth or less storage space will be needed for the transfer or storage of the haptic data. During the multiplexing stage 140, the encoded haptic data joins the source multimedia data stream so that the encoded haptic data and the source multimedia data may be interleaved during the multimedia interleaving stage 150.

In an embodiment, the audio data extracted from the multimedia data during stage 110 may be just raw data, e.g., in bit stream in PCM format. In an embodiment, the audio data may have been encoded already, such as encoded using an Advanced Audio Coding (AAC) encoder. In the latter case, the encoded audio data may be first decoded, either as the last step of the stage 110 or as the first step during stage 120. In an embodiment, the haptic data that is used during stage 130 may not be generated from the audio data contained in multimedia data 110, but may instead come from a different source, such from a raw haptic data storage 125, as illustrated in FIG. 1. In an embodiment, the video data instead of or in addition to the audio data may be used to generate haptic data in the method 100 described above. For example, certain video data transitions, e.g., a lightening scene, may be used as a trigger for a haptic effect to be provided to a user so that the user may experience a sense of rumbling thunder associated with the lightening scene.

Figure 2:
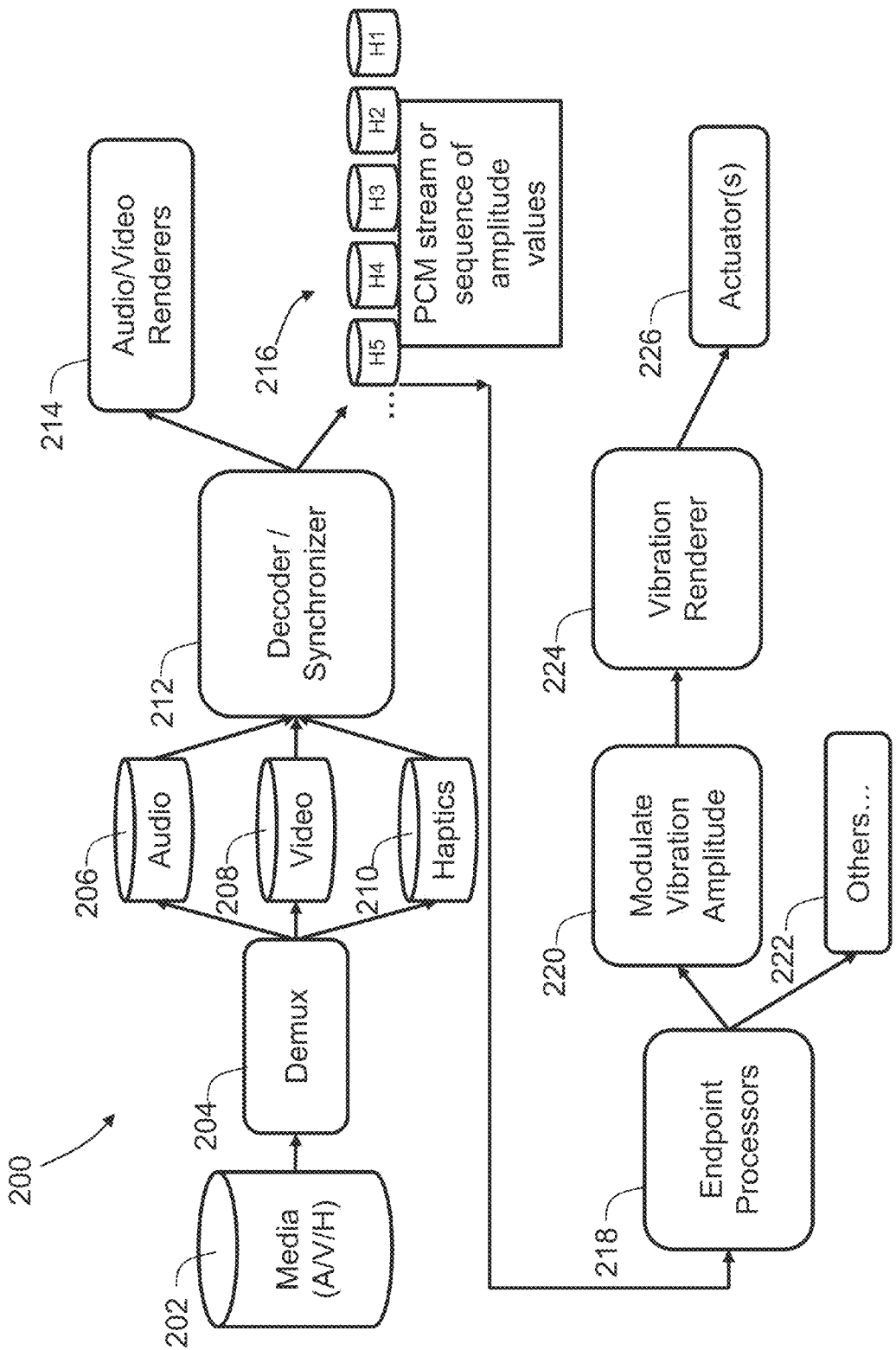
FIG. 2 illustrates an embodiment of a method for decoding and displaying haptic data in synchronization with other encoded multimedia data.

FIG. 2 illustrates a method 200 of decoding and displaying haptic data in synchronization with other encoded multimedia data, according to an embodiment of the invention. In an embodiment, a de-multiplexer 204 may first separate an interleaved multimedia data stream 202 into different data streams, including an audio data stream 206, a video data stream 208 and a haptic data stream 210 at an end device in which the interleaved multimedia data 202 is to be played. In an embodiment, a decoder/synchronizer 212 may contain one or more audio decoders, one or more video decoders and one or more haptic decoders (not depicted). The decoded audio data and video data may be sent to audio/video renderers 214 (e.g., speakers and display screens) for playback. The decoded haptic data stream 216 may be sent to one or more haptic output devices, such as devices H1, H2, H3, H4 and/or H5, for displaying in synchronization with the audio and video data.

In an embodiment, the haptic output device H1 . . . H5 may consist of at least one endpoint processor 218, a vibration amplitude modulator 220, a vibration renderer 224 and at least one actuator 226. Other signal processing devices 222 may also be used to alter the signal(s) output by the endpoint processor(s). The illustrated embodiment is not intended to be limiting in any way.

As referred to herein, "haptic output device" may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys, a macro-composite fiber actuator, an electrostatic actuator, an electro-tactile actuator, and/or another type of actuator that provides a physical feedback such as a haptic (e.g., vibrotactile) feedback. The haptic output device may include non-mechanical or non-vibratory devices such as those that use electrostatic friction ("ESF"), ultrasonic surface friction ("USF"), or those that induce acoustic radiation pressure with an ultrasonic haptic transducer, or those that use a haptic substrate and a flexible or deformable surface, or those that provide projected haptic output such as a puff of air using an air jet, and so on. Such implementations of haptic output devices are known to one of ordinary skill in the art and therefore are not discussed in further detail herein.

Figure 3:
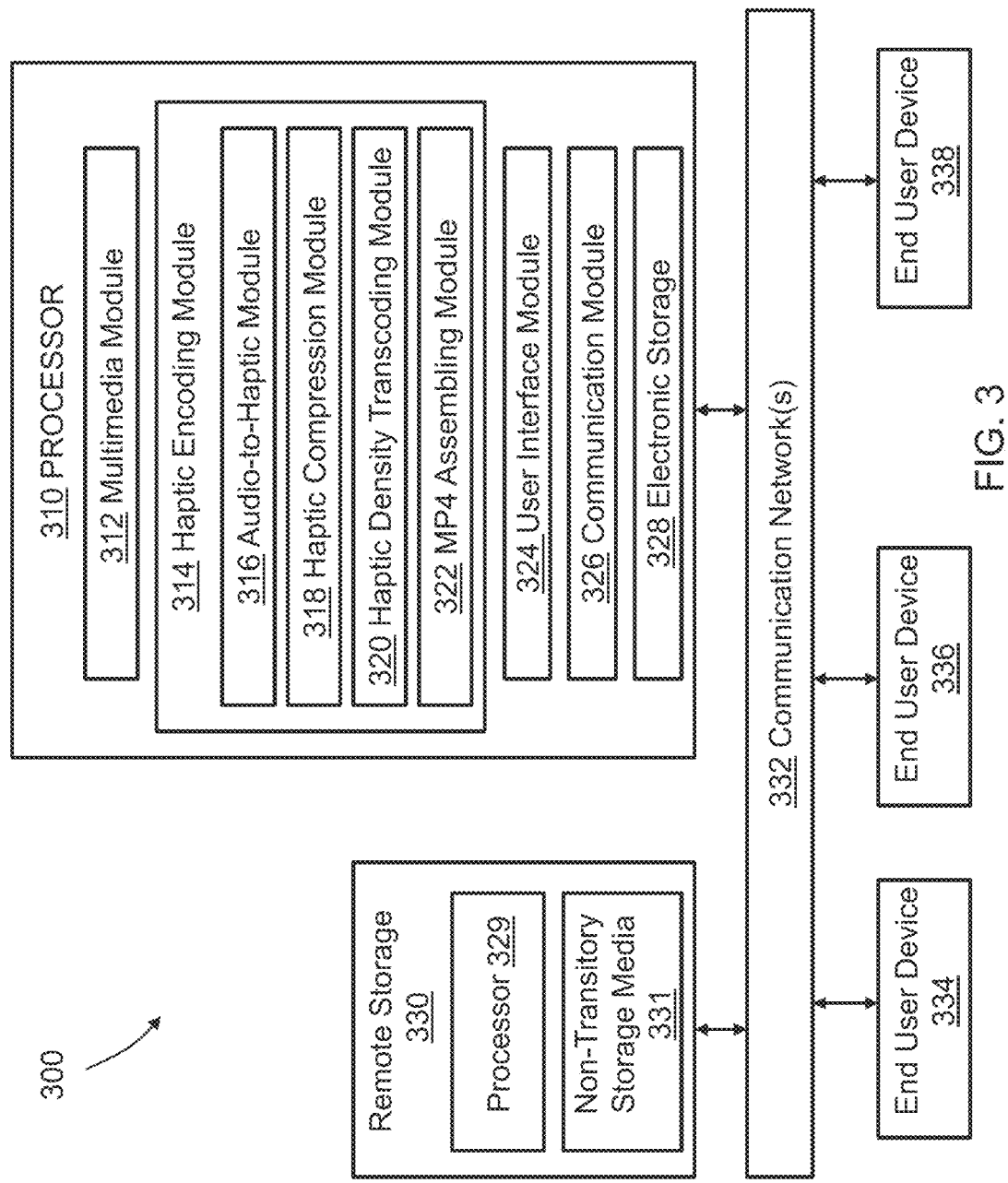
FIG. 3 illustrates an embodiment of a system for transferring encoded haptic data with multimedia data over a communication network.

FIG. 3 illustrates an embodiment of a system 300 for transferring encoded haptic data with multimedia data over a communication network. As illustrated, the system 300 includes a processor 310, a remote storage 330, end user devices 334, 336 and 338, and one or more communication network(s) 332 connecting processor 310, remote storage 330 and end user devices 334, 336, 338. In an embodiment, the processor 310 may include its own electronic storage 328 in addition to or in place of the remote storage 330. In an embodiment, the remote storage 330 may also include a processor 329 and non-transitory storage media 331. The processor 329 may maintain a digital content database and profile information of the end user devices 334, 336, 338, as described in further detail below with respect to FIG. 4.

The processor 310 may be a general-purpose or specific-purpose processor or microcontroller for managing or controlling the operations and functions of the system 300. In an embodiment, the processor 310 may be specifically designed as an application-specific integrated circuit ("ASIC") embedded in, for example, the end user device 334 and configured to provide haptic effects through a haptic output device in the end user device 334 to enhance a user's enjoyment of a movie being played on the end user device 334. In an embodiment, the processor 310 may also be configured to determine, based on predefined factors, what haptic effects are to be generated based on the feedback received over the communication network(s) 332 from another remote end user device 336, and then provide streaming commands that may be used to drive a haptic output device on the end user device 336, for example. The network 332 may include wired or wireless connections. In some aspects of the invention, the network may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

For example, the communication network 332 may be a CDN (Content Distribution Network), which is typically used to distribute content (such as websites, videos, music, etc.) to enable much faster access to such assets or content globally. A CDN utilizes Edge servers around the world to essentially mirror frequently accessed content, and also automatically manages the lifecycle of the content on the Edge servers. The actual assets or content are typically stored and updated on a more permanent origin server, and the CDN automatically accesses the assets and content, as needed, and mirror them to the appropriate Edge servers.

In an embodiment, the processor 310 may include a plurality of processors, each configured to perform certain functions within the system 300. In an embodiment, the processor 310 may be configured to execute one or more computer program modules. The one of more computer program modules may include at least one multimedia module 312, one or more haptic encoding modules 314, a user interface module 324, and a communication module 326. In an embodiment, the haptic encoding modules 314 may include an audio-to-haptic conversion module 316, a haptic compression module 318, a haptic density transcoding module 320 and a multimedia assembling module 322. For example, the multimedia assembling module 322 may be configured to assemble a multimedia data stream including audio, video and haptic data according to an MP4 container format, as illustrated in FIG. 3. In an embodiment, the local storage 328 and the remote storage 330 may be used to store various profiles for different use cases of haptics and generated haptic data streams, before compression and after compression, as discussed in more detail below.

Although modules 312-326 are illustrated in FIG. 3 as being co-located within a single processing unit 310, in embodiments in which the processor 310 includes multiple processing units, one or more of modules 312-326 may be located remotely from the other modules. The description of the functionality provided by the different modules 312-326 described in more detail below is for illustrative purposes, and is not intended to be limiting, as any of the modules 312-326 may provide more or less functionality than is described. For example, one or more of the modules 312-326 may be eliminated, and some or all of its functionality may be provided by other ones of the modules 312-326. As another example, the processor 310 may be configured to execute one or more additional modules that may perform some or all of the functionality attributed below to one of the modules 312-326. The function and operation of modules 312-326 are described in more detail below.

Adaptive Audio to Haptic Conversion

As described above, there are various types of haptic output devices that may be used to display or playback haptic data. Audio-to-haptics algorithms that are tailored specifically to each type of haptic output device and different types of haptic output devices and different audio-to-haptics algorithms may result in haptic data streams with different characteristics. Maintaining a list of audio-to-haptic conversion algorithms for haptic data generation that includes a specific audio-to-haptic conversion algorithm specifically tailored for each type of haptic output device and to a specific end user device may become difficult to maintain as the number of audio-to-haptic conversion algorithms and haptic output devices increases.

In an embodiment, each type of haptic output device that is included in an end user device that generally includes audio-to-haptics conversion algorithms may be treated as an endpoint, and each algorithm for that haptic output device may be treated as a profile that aims to give a particular experience. Embodiments of the invention allow the system to automatically detect the type of haptic output device, and any additional factors that may be used to change audio-to-haptics conversion profiles. In an embodiment of the system, the user may also select which profiles he/she wants active during a given use case.

Embodiments of the invention may save compilation time by only having a developer compile all available algorithms for each endpoint (i.e. haptic output device), at most, once. There are different situations in which a user may want a different experience such that one algorithm on the device at a time may not be enough. The audio-to-haptics automatic conversion algorithm may not be the same for music as it is for movies, and additionally, as it is for games, etc. The endpoint(s) (i.e. haptic output device(s)) in an end user device are typically fixed, but the embodiments described herein allow an end user device to adapt its behavior based on application focus, sensor-based data and environmental factors.

Figure 4:
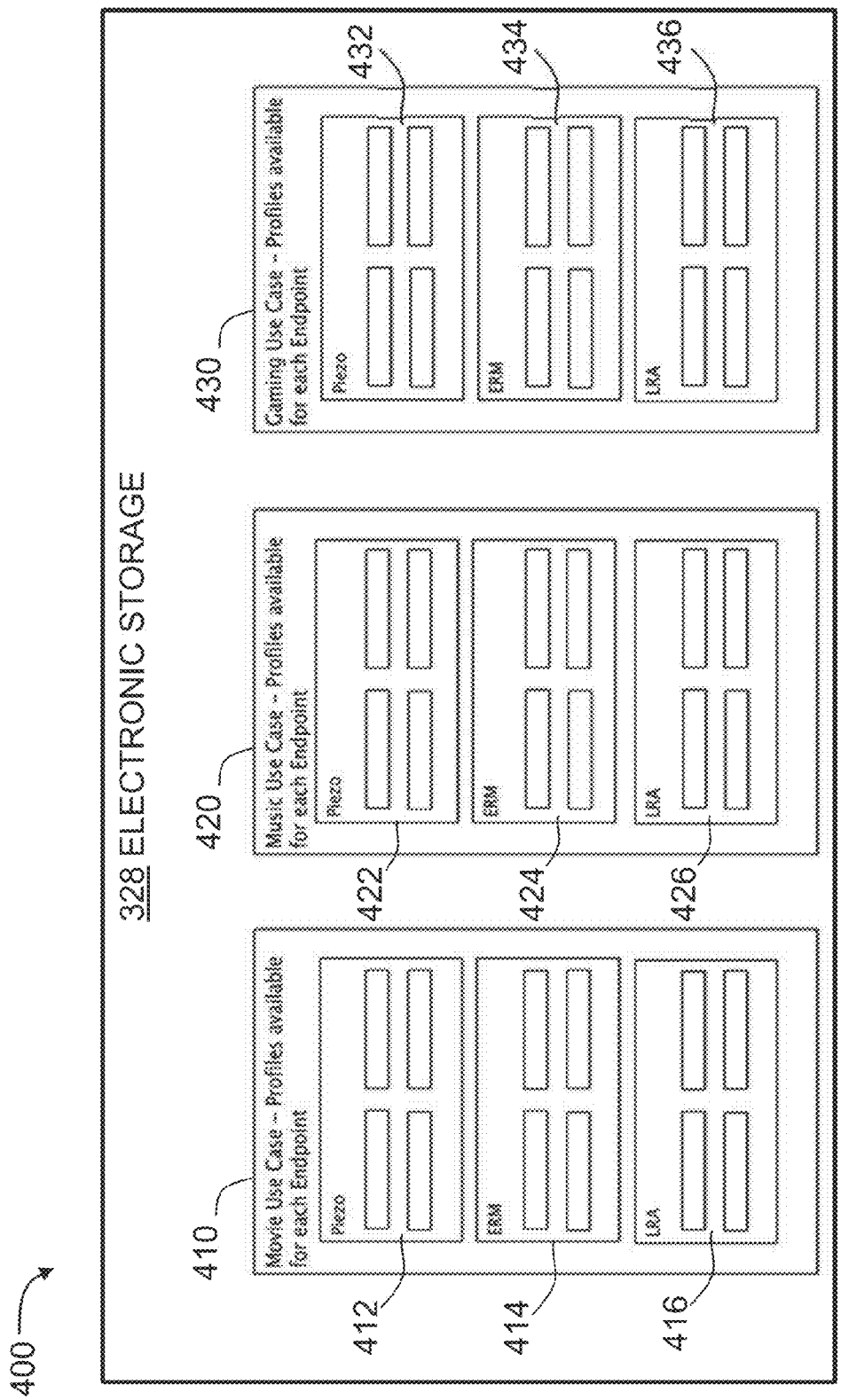
FIG. 4 illustrates an embodiment of a data structure of storing different profiles used for creation of haptic data.

FIG. 4 illustrates an embodiment of a database 400 of different profiles used for generating haptic data. In an embodiment, the profiles may be stored in the electronic storage 328. In an embodiment, the profiles may be organized according to their use case, for example, movie use case 410, music use case 420 and gaming use case 430. In the movie use case 410, the haptic effects are intended for an end user to experience while watching a movie or any other video, such as a television show or an advertisement. In the music use case 420, the haptic effects are intended for an end user to experience while listening to the music. Similarly, in the gaming use case 430, the haptic effects are intended for an end user to experience while playing a game.

It may be advantageous to organize profiles based use case, because in each different use case, a user may want a different haptic experience. The haptic effect ideally would not be the same for music as it is for movies, and additionally, as it is for games, etc. Within each use case, the profiles may be stored for each endpoint (i.e. haptic output device on an end user device that generally has audio-to-haptics conversion algorithms). For example, for a movie use case 410, profile 412 is stored for an end user device 334 that has an audio-to-haptic conversion algorithm specifically for a piezoelectric actuator, profile 414 is stored for an end user, device 336 having an ERM actuator and corresponding audio-to-haptic conversion algorithm, and profile 416 is stored for an end user device 338 having an LRA and corresponding audio-to-haptic conversion algorithm. For a music use case 420, profile 422 is stored for the end user device 334 that has a piezoelectric actuator, profile 424 is stored for the end user device 336 that includes an ERM actuator, and profile 426 is stored for the end user device 338 that includes an LRA. Similarly, profile 432 is stored for a gaming use case 430 in which the haptic output device is a piezoelectric actuator, profile 434 is stored for a gaming use case and an ERM actuator, and profile 436 is stored for a gaming use case and an LRA. In an embodiment, a single end user device may contain more than one endpoint.

Embodiments of the invention may save compilation time by having all available profile algorithms compiled for each endpoint, at most once, either offline or in real time. In addition, embodiments of the invention allow the endpoint to adapt its behavior based on application focus, sensor-based data and environment factors even though the endpoint (haptic output device) in a single device may not be changed.

In an embodiment, the system 300 may automatically detect the type of haptic output device and additional factors. For example, the audio-to-haptic module 316 may communicate with the end user device 334 through the communication module 326 over the communication network 332 to determine the type(s) of haptic output device(s) that end user device 334 has, which may be used to change audio-to-haptics conversion profiles. In an embodiment, a user of the end user device 336 may communicate with the haptic encoding module 314 over the communication network 332 through the user interface module 324 to select which profiles he/she wants active during a given use case.

Figure 5:
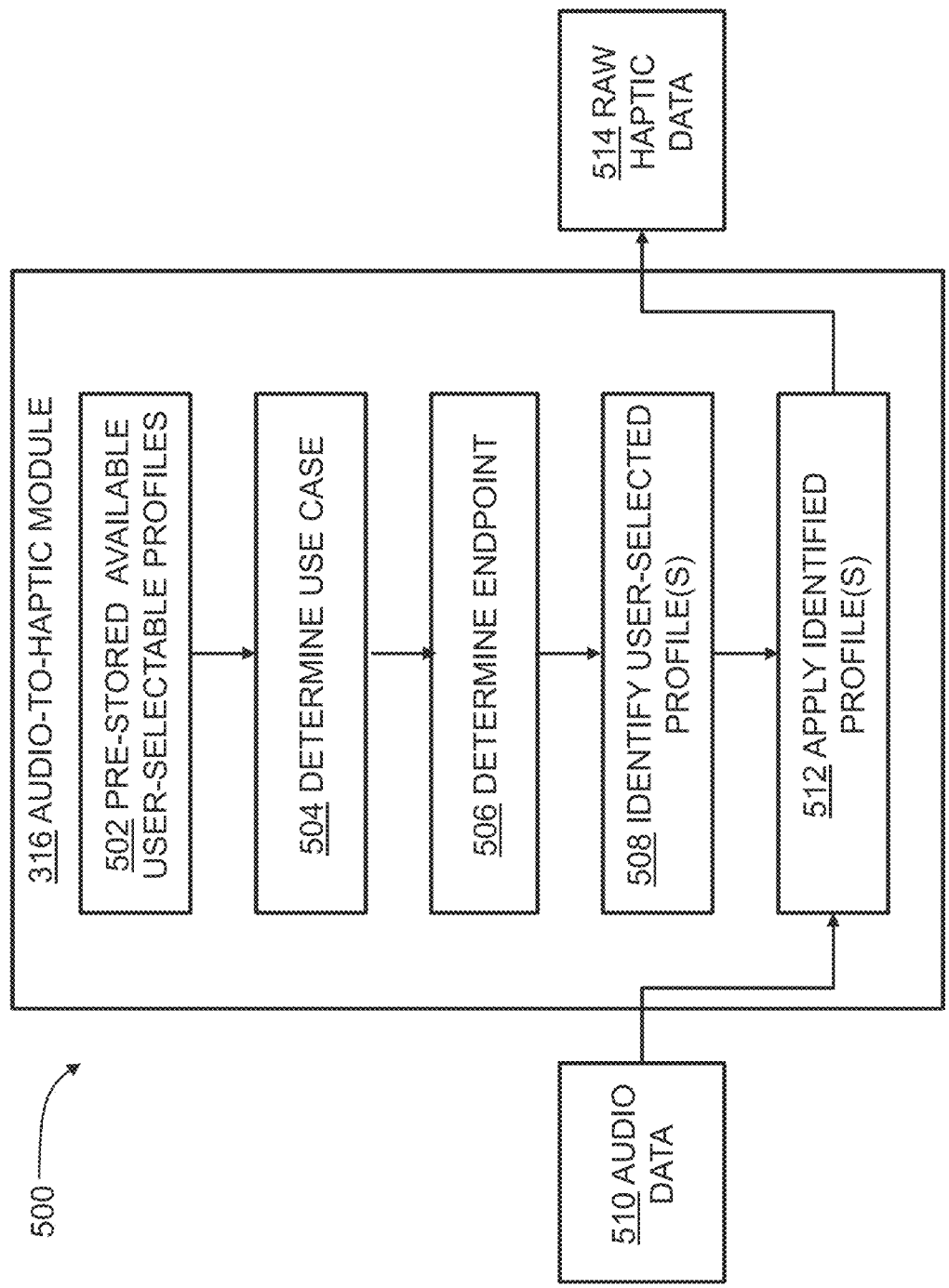
FIG. 5 illustrates an embodiment of a user-selectable method in which haptic data is generated based on endpoints and use cases.

FIG. 5 illustrates a user-selectable embodiment of the audio-to-haptic module 316 in which haptic data is generated based on endpoints and use cases. In this embodiment, at 502, the audio-to-haptic module 316 pre-stores all available audio-to-haptics algorithms in the database 400 depicted in FIG. 4. Each audio-to-haptics algorithm may be identified in a way that is understandable to a user. This may be done either via an audio-to-haptics settings application/activity, or a separate application/activity.

When it is desired to add haptic effects to the digital content to be played at an end user device, at 504 the audio-to-haptic module 316 determines the use case based on the requested information, or user input. In an embodiment, the audio-to-haptic module 316 may also check during the use-case determination step 504 which application is running in the foreground or the background, so the device may re-configure the audio-to-haptic module 316 to execute a user selected audio-to-haptics algorithm.

At 506, the audio-to-haptic module 316 determines the endpoint configuration of the requesting end user device. In an embodiment, the audio-to-haptic module 316 may simply make the determination by obtaining user input through the user interface module 324. In an embodiment, the audio-to-haptic module 316 may look up in a registered end user device database stored in the electronic storage 328 to obtain the endpoint configuration. In an embodiment, the audio-to-haptic module 316 may communicate with the requesting end user device via the communication module 326 to obtain the endpoint configuration. In an embodiment, an end user device may have multiple endpoints for the purpose of displaying different types of haptic effects. For example, the end user device 338 may have an LRA, a piezoelectric actuator, and an ERM actuator.

After having obtained information on both use case and endpoint configuration, at 508, the audio-to-haptic module 316 may identify the user-selected profile(s). In an embodiment, this may achieved by using a look-up table in the database 400, as depicted in FIG. 4.

Based on the configuration of the endpoint and the user-selected profile(s), at 512, the audio-to-haptic module 316 may configure itself to apply the appropriate algorithm(s) to audio data 510 and generate raw haptic data 514. For example, if the user has a device that has an LRA and selects a 'bassy' profile for music playback, when music is playing, the audio-to-haptic module 316 understands that it is a music use case, and selects the 'bassy' processing algorithm (e.g., low frequencies only) out of the profile 416 that is created specifically for an LRA. If the device has a piezoelectric actuator or an ERM actuator instead of an LRA, the corresponding algorithm will be selected from the profiles 410, 414 for either of those endpoints.

In an embodiment, the processor 310 may include a haptic-to-haptic module (not shown) that is configured to apply an appropriate algorithm to convert the raw haptic data 514 intended for one endpoint to raw haptic data for another endpoint. For example, the haptic-to-haptic module may convert the raw haptic data 514 that was generated for an LRA to haptic data for a piezoelectric actuator or vice-versa. Such a haptic-to-haptic signal conversion may be completed when the haptic data is being encoded or when the haptic data is decoded at the end user device.

Figure 6:
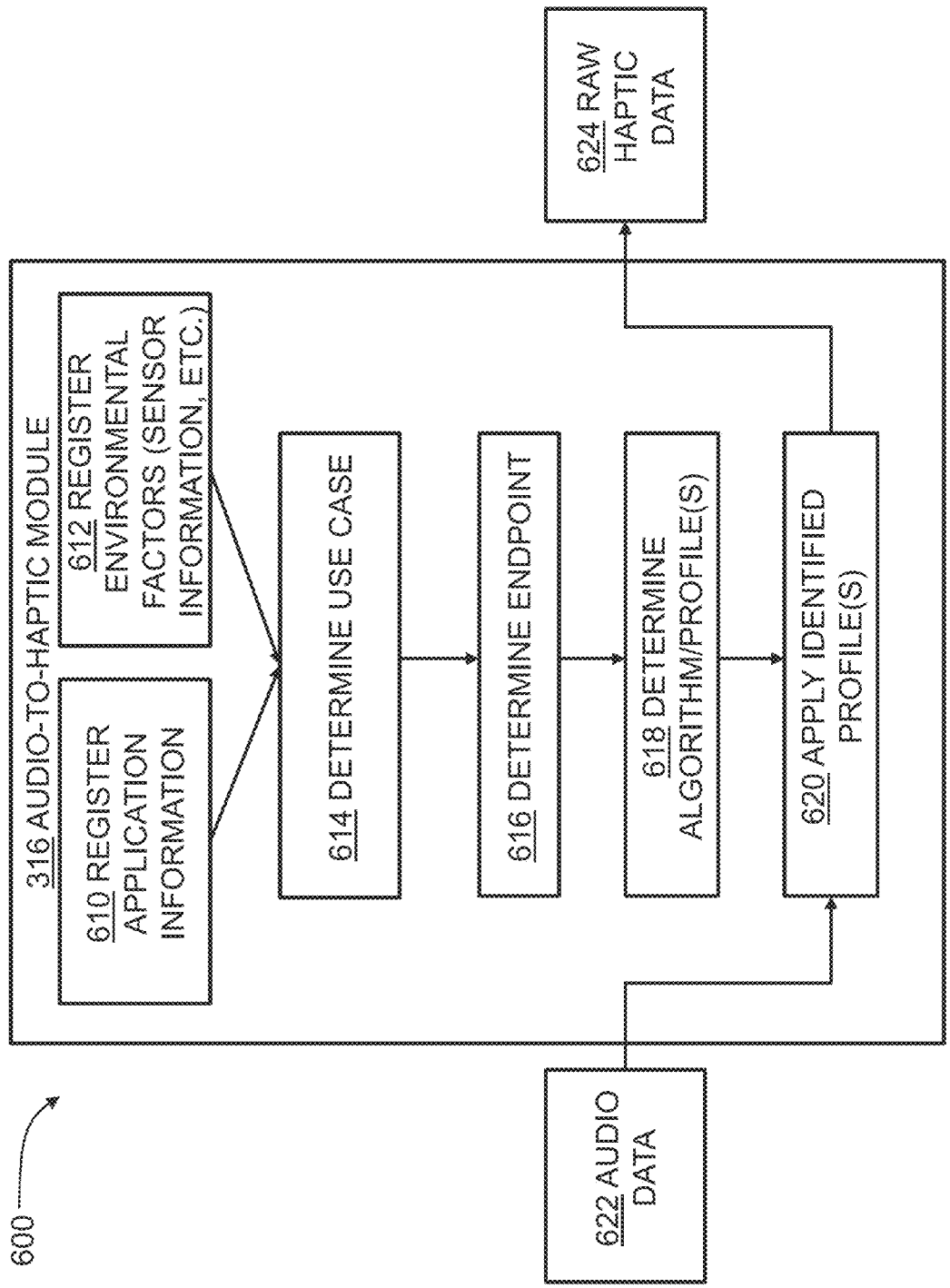
FIG. 6 illustrates an embodiment of an automatic-detection method in which haptic data is generated based on endpoints and use cases.

FIG. 6 illustrates an auto detection embodiment 600 of the audio-to-haptic module 316 in which haptic data is generated based on endpoints and use cases without the user specifying an audio-to-haptics algorithm. At 610, the audio-to-haptic module 316 may register information of a digital content playing application when the application is installed on an end user device (or system 300). Examples of such applications include an audio player, a video player, or a game player. At 612, the audio-to-haptic module 316 may register environmental factors, such as factors that may be measured by a sensor(s) on the end user device or system. For example, the lighting surrounding the end user device (e.g. bright or dark), the temperature external to the device, etc. may be sensed and used as input to determine which profile to use at a given time. For example, if it is determined that the device is being used in a low lighting environment, more pronounced or less pronounced haptic effects may be desirable by the user.

When it is desired to add haptic effects to the digital content to be played at an end user device, at 614 the audio-to-haptic module 316 may determine the use case based on the request information, or user input. At 616, the audio-to-haptic module 316 determines the endpoint configuration of the end user device on which the haptic effects are to be displayed alongside the multimedia data.

In an embodiment, the audio-to-haptic module 316 may make the determination by obtaining user input through the user interface module 324. In an embodiment, the audio-to-haptic module 316 may communicate with the requesting end user device (e.g., end user device 338) via the communication module 326 to obtain the endpoint configuration. In an embodiment, an end user device may have multiple endpoints for the purpose of displaying different haptic effects. For example, the end user device 338 may have an LRA, a piezoelectric actuator, and/or an ERM actuator.

After having obtained information on both use case and endpoint configuration, at 618 the audio-to-haptic module 316 may identify an appropriate profile or conversion algorithm to use that takes into consideration all the information collected and determined during steps 610-616, without a user selection. In an embodiment, this may be achieved by using a look-up table in the database 400 depicted in FIG. 4. At 620, the audio-to-haptic module 316 may then configure itself to apply the determined conversion algorithm to audio data 622 and generate raw haptic data 624.

The auto-detection embodiment 600 as illustrated in FIG. 6 differs from the user-selectable embodiment 500 illustrated in FIG. 5 in that a user does not have to interact directly with the system 300 or the end user device 334, 336, 338 to configure the audio-to-haptic module 316. In the auto-detection embodiment 600, the audio-to-haptic module 316 may use external factors including sensor information, the use case, as well as the endpoint (haptic output device) configuration in an end user device to adaptively select an audio-to-haptic conversion algorithm that is best suited for a given specific application for the digital content to be played.

In an embodiment, the encoder may encode the haptic data for each endpoint and multiplex the haptic streams, and all of the haptic streams may be communicated to the end user device. The end user device may identify and extract the appropriate haptic signal that matches the endpoint (haptic output device) in that particular end user device.

Variable Encoding of Haptic Streams

The generated haptic data as discussed above may be referred to as a raw haptic data stream. As discussed above, storing and/or transferring a raw haptic data stream may not be the most efficient way to communicate haptic data for various reasons. For example, there may be periods of silence (no haptic data) in the stream.

Figure 7:
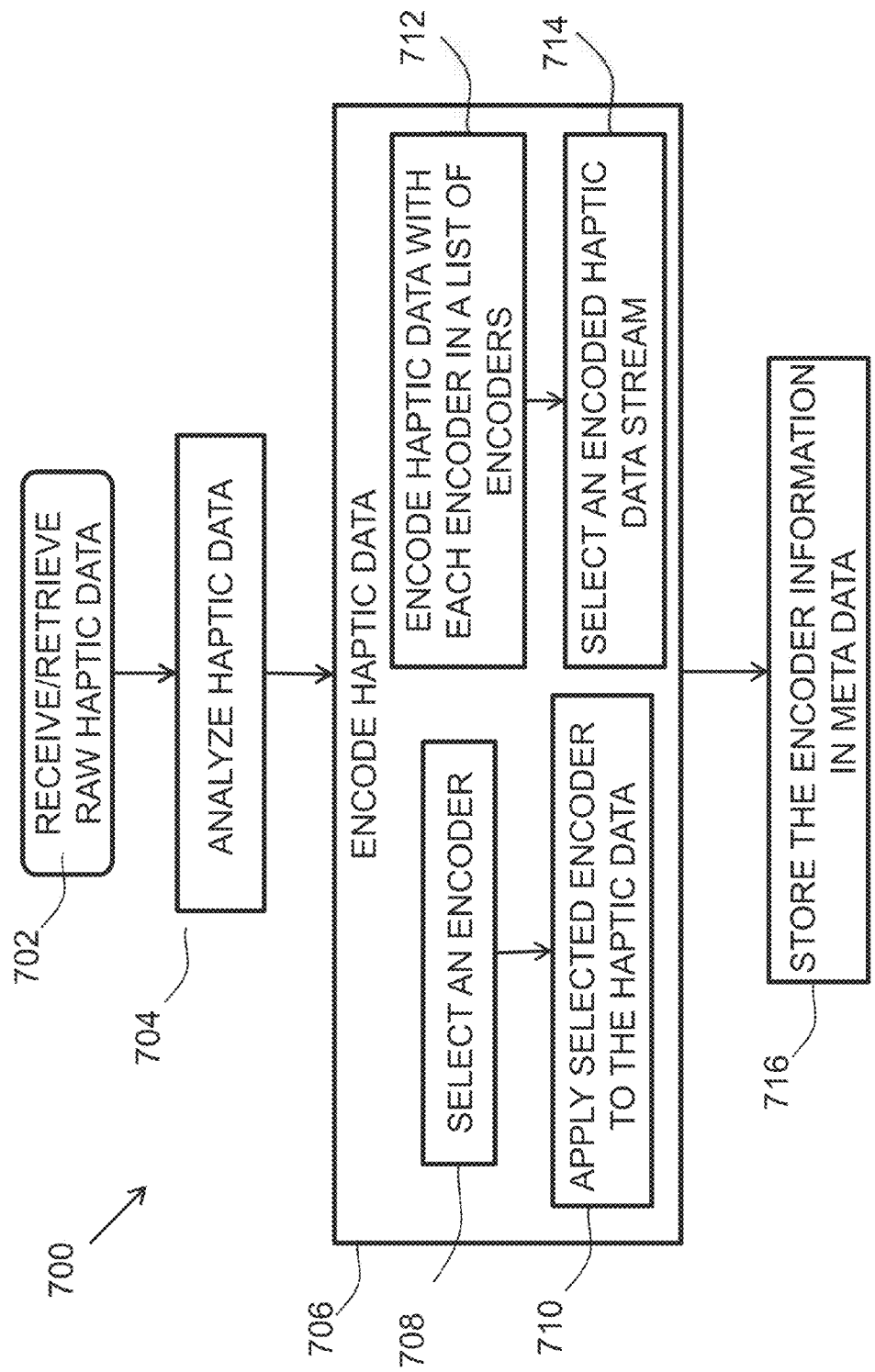
FIG. 7 illustrates an embodiment of a method for encoding a haptic data stream for transmission over a network.

FIG. 7 illustrates an embodiment of a method 700 for encoding a raw haptic data stream for transmission over a network. In an embodiment, at 702 the haptic encoding module 314 receives raw haptic data that may be generated by the audio-to-haptic module 316 (e.g., step 514 of FIG. 5 and step 624 in FIG. 6) and/or the haptic-to-haptic module. At 704, the content of the haptic data is analyzed to determine the characteristics of the raw haptic data stream, which may include the types of haptic output device the haptic data are intended to be played by, the intended use case of the raw haptic data, the frequency of the raw haptic data, the length of the silence in the raw haptic data stream, the amplitude of the raw haptic data, etc. At 706, the haptic encoding module 314 may then encode the raw haptic data based on the determined characteristics of the raw haptic data to meet pre-defined criteria.

In an embodiment, at 708 the haptic encoding module 314 may first select an encoder from a list of encoders for that particular stream and then at 710 apply the selected encoder to the raw haptic data stream. For example, there are many audio encoders that may be used to encode a haptic stream for compression purposes. However, audio encoders have their advantages and disadvantages. For example, the AAC mentioned above may be better in terms of space and quality for general encoding, and the Free Lossless Audio Codec (FLAC) may be better when the stream has a lot of silence. Any other suitable encoder, i.e. digital signal coder/compressor other than AAC or FLAC may be used. An appropriate encoder should be selected to match the determined characteristics of the raw haptic data stream to ensure the efficacy and efficiency of the encoded data stream.

In an embodiment, pre-determined criteria may be used to preserve the range of frequency of the raw haptic data that matches the haptic output device to be used for playback at the end user device, which may require the haptic encoding module 314 to access the database 400 that includes the pre-stored use cases and endpoint profiles discussed above with respect to FIG. 4.

In an embodiment, at 712 the haptic encoding module 314 may encode the raw haptic data stream with each encoder in a list of pre-determined encoders, and then at 714 select the encoded haptic data stream that has the least number of bits as the encoding output. In an embodiment, at 716 the haptic encoding module 314 may then store the information about the encoder used and any other information needed for decoding the encoded haptic data stream. In an embodiment, the encoder information for the encoded haptic data stream may be embedded in the container format's metadata. On the end user device side, this information may be parsed out and the correct decoder may be used to decode the stream. For example, the encoder information may be embedded in user private or a custom atom in the MPEG4 format.

In an embodiment, the haptic encoding module 314 may also take into consideration the bandwidth availability in encoding the raw haptic data when the raw haptic data is to be streamed over a communication network, as discussed in more detail below.

Adaptive Density Transcoding

In an embodiment, a method of preserving the haptic signal quality is provided by leveraging the characteristics of haptic waveforms in the haptic data stream while also sending fewer bits. Because a goal of using a multiple-encoding scheme is to transmit a smaller amount of data for congested networks, embodiments of the invention provide adaptive density streaming for a haptic data stream. The density factor may determine how dense or sparse a signal is by applying haptics to certain amounts of data based on a threshold. If this is done at the transcoding stage to encode haptic data streams using different density factors, haptics may be sent with less data when network bandwidth is not freely available, and with more data when there is ample available network bandwidth.

In an embodiment, the relevant and high quality part of haptic data is kept while unnecessary data are cut so that less of the available network bandwidth is occupied at a given time. When transmitting digital content, adding a separate type of media to be streamed along with audio/video/metadata may naturally affect the audio/video/metadata quality. Embodiments of the invention may help minimize how much the quality of the audio/video signal is affected, while providing a pleasant haptic experience with less overhead.

Figure 8A:
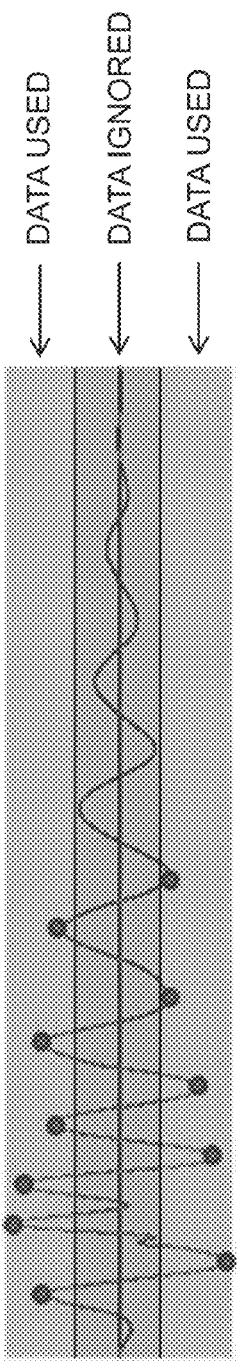
FIGS. 8A-8C illustrate embodiments of haptic signals with different density factors.
Figure 8B:
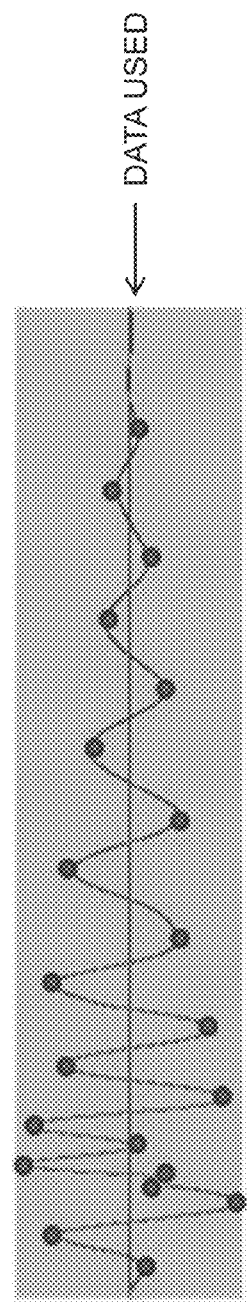
Figure 8C:
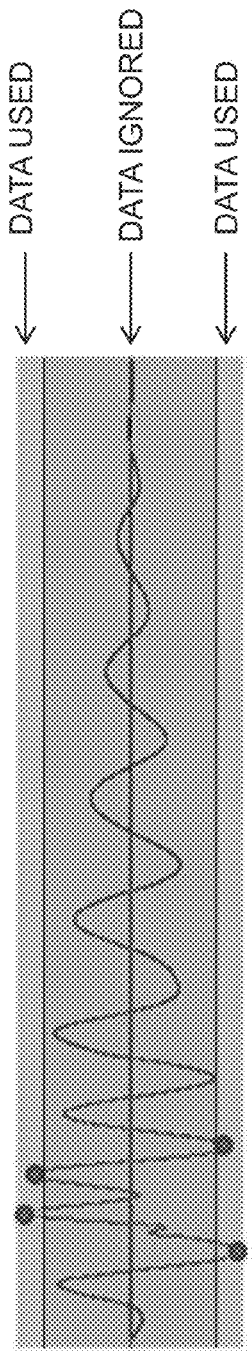

FIGS. 8A-8C illustrate embodiments of different density factors that may be used for encoding a raw haptic signal (data stream) for streaming over a network. FIG. 8A illustrates a medium density factor, FIG. 8B illustrates a high density factor, and FIG. 8C illustrates a low density factor. The lighter shaded areas in FIGS. 8A-8C ("data used" areas) indicate what parts of the signal are used and encoded, and the darker shaded areas in FIGS. 8A and 8C ("data ignored" areas) indicate what parts of the signal are ignored.

For example, FIG. 8A illustrates a raw haptic data signal to be encoded using a medium density factor. If the signal represents the raw haptic data that is input into the transcoder, the transcoder may output haptic data corresponding to a signal within just the "data used" area, which would be less data than what exists in the signal with a high density factor. FIG. 8B illustrates a raw haptic data to be encoded using a high density factor. For streams when network bandwidth is available, using such a high density factor in the transcoding may be useful as more data may stream across the network. FIG. 8C illustrates a raw haptic data to be encoded using a low density factor. For streams when there is a large amount of network congestion, this type of transcoding may be suitable, as the output stream would deliver fewer bits of data and only send data for relatively high magnitude events.

As shown in FIGS. 8A-8C, the amount of data to appear in the output signal may be adjusted by changing the density factor, which allows the haptic encoding module 314 to forego certain information, which may be of less importance (e.g., signals that are so low in magnitude that the signals are not worth playing, or miniscule details in the haptic signal that may be ignored to preserve bandwidth), in the signal when needed and include more data when more bandwidth over the network becomes available. In an embodiment, it is assumed that data with value zero in the signal (i.e. at the centerlines in FIGS. 8A-8C) indicates that nothing from the haptic signal needs to be transmitted.

Figure 9:
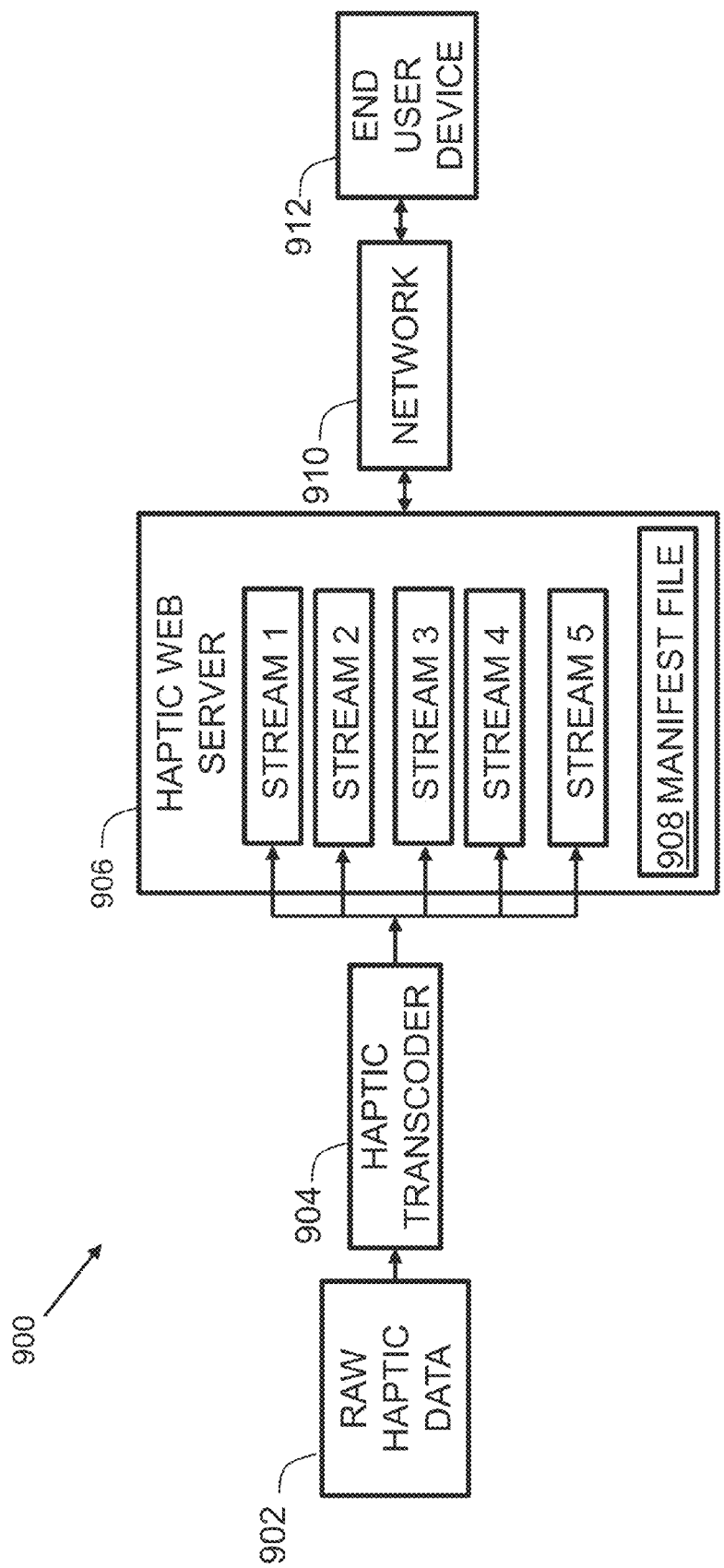
FIG. 9 illustrates an embodiment of a method for adaptive haptic density transcoding.

FIG. 9 illustrates an embodiment of an adaptive haptic density transcoding method 900. As used herein, transcoding is interchangeable with encoding of the raw haptic data but emphasizes that the encoding is for a conversion from a source (e.g., a streaming server) to a different destination (e.g., a remote end user device). As illustrated, the input is raw haptic data 902, such as data generated by the audio-to-haptic module 316, as described above. A haptic transcoder 904 encodes the raw haptic data 902 at multiple bit rates, each corresponding to a specific density factor as described above with respect to FIGS. 8A-8C. A haptic web server 906 stores the haptic bit streams encoded with different density factors, and maintains a manifest file 908 for the encoded haptic data streams. An end user device 912 (such as end user devices 334, 336, 338 in FIG. 3) communicates with the haptic web server 906 through a network 910 (or 332 as in FIG. 3) to receive one of the encoded haptic data streams for a given raw haptic signal 902.

In an embodiment, the density of the haptic data stream may be adjusted by modifying a density factor between 1 and 15 (15 being highest density, 1 being lowest density). This value acts as a threshold (as discussed above) for how much data will be included in the encoded haptic data stream. As a result, the lower the density value, the less low-magnitude (less-important) raw haptic data will be included in the encoded haptic data stream. As the transcoder 904 increases the density threshold, more low-magnitude and detailed data are incrementally added to the encoded haptic data stream. Therefore, higher densities map to better network connectivity and lower densities map to lesser network connectivity.

Figure 10:
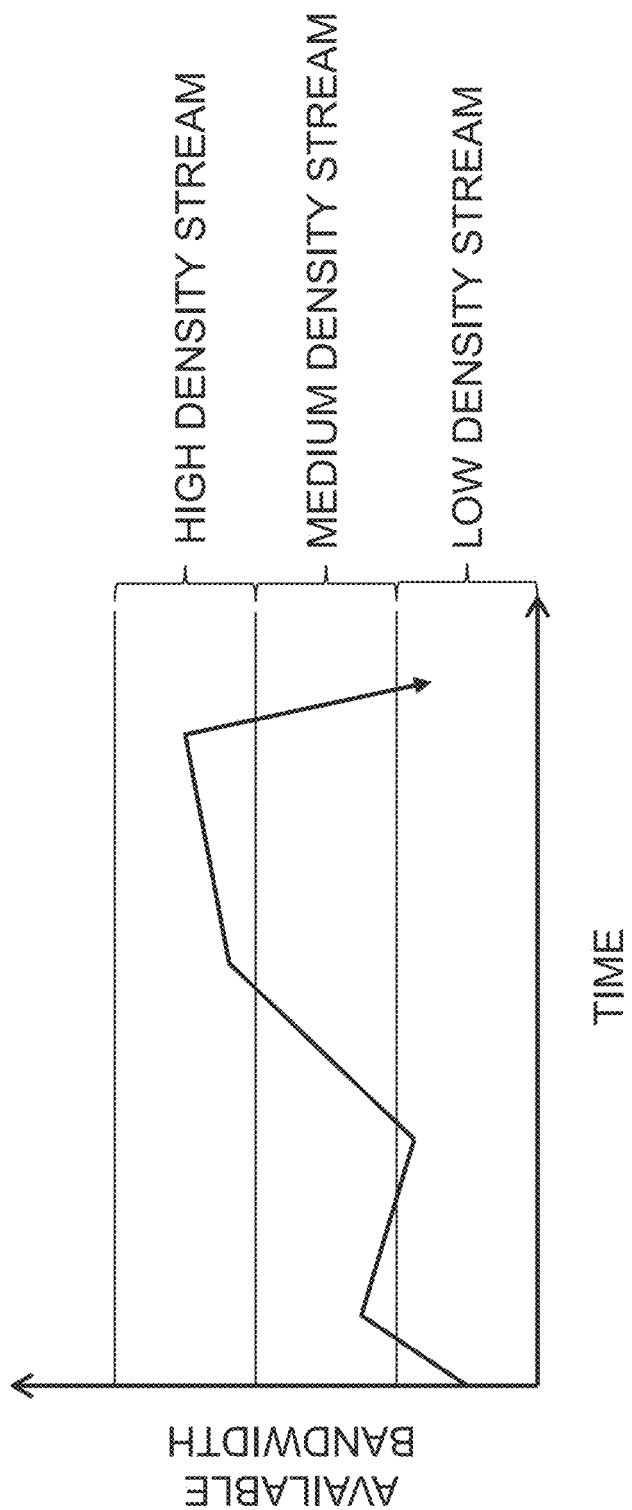
FIG. 10 illustrates an embodiment of adaptive density transcoding operating in relation to available network bandwidth over time.

As illustrated in FIG. 9, the haptic web server 906 stores the haptic bit streams 1-5 encoded with five different density factors, and maintains a manifest file 908 for the encoded haptic data streams corresponding to a specific raw haptic data input. For example, stream 1 in web server 906 is encoded with a density factor of 1, stream 2 with a density factor of 2, and so on. The end user device 912 is made aware of the available haptic data streams at different bit rates and segments of encoded haptic data streams. When starting, the end user device 912 may request the segments from the lowest bit rate haptic data stream 1. If the end user device 912 finds the download speed of the network is greater than the bit rate of the segment downloaded, then the end user device 912 may request the next higher bit rate segments, e.g., segments of stream 2 or what would be considered to be a medium density stream, as illustrated in FIG. 10. Later, if the end user device 912 determines that the download speed for a segment is lower than the bit rate for the segment, the end user device 912 determines that the network throughput has deteriorated, and may request a lower bit rate segment, as illustrated in FIG. 10. If the available bandwidth significantly increases, the end user device 912 may request a higher bit rate segment or what would be considered to be a high density stream, as illustrated in FIG. 10, and so on. The segment size may vary depending on the implementations. In an embodiment, the segment size may be as low as 2 seconds. In an embodiment, the segment size may be as high as 10 seconds.

In an embodiment, the haptic density transcoding module 320 may be integrated with the same algorithms that transcode audio/video for network transmission (e.g., multimedia module 312 in FIG. 3). The number of haptic streams created would be equal to the number of audio/video streams created, and the density factor for each haptic stream would not necessarily have to be different for each transcoding. For example, in an embodiment, if there are 10 different audio/video streams created, raw haptic data may be transcoded 5 times with 5 different density factors.

It should be noted that the adaptive bitrate transcoding of the haptic data discussed above may not be the same as adaptive bitrate streaming used to pre-render audio/video at different qualities to support varied network connectivity when streaming media data. The latter typically focuses on sending fewer bits through applying compression algorithm(s) to all of the input audio data or video data. With a haptic data stream, the adaptive bitrate transcoding according to embodiments of the invention sends less of the signal, but still provides relative haptic effects by forgoing specific sections of the haptic signal that are not important (i.e. low magnitude) and focusing on higher priority sections of the haptic signal. This may preserve the actual haptic quality by leveraging the characteristics of the haptic waveforms while also sending fewer bits, thus reducing the bandwidth needed. Another potential benefit of embodiments of the invention is that the same format of the original haptic signal may be kept for the encoded haptic data with a different density. In conventional transcoding, the format of the source may not be preserved, as it may be re-encoded into a different format to compress the data for network transmission.

MP4 with Embedded Haptics

Embodiments of the invention also provide a method for embedding haptic bit streams in a MP4 compatible file container so that haptic data may be streamed with other digital content without impact on the delivery of the other digital content. The same method may be applied to other similar file containers as well.

Although MP4 is described below as the container format for streaming digital content over a network, because MP4 is currently considered to provide the most flexibility in terms of supported formats, as well as the ability to modify it for embedding varying types of data interleaved with the standard audio and video streams to create novel experiences, it should be understood that embodiments of the invention may also be applied to other container formats. Although varying types of data include additional audio streams, closed captioning streams, etc., embodiments of the invention will be described with respect to interleaving a haptic stream with the audio and/or video streams that can exist within an MP4 container. On the end user device side, the embedded haptic signal may be extracted and played back over a haptic output device, simultaneously with standard audio and video playback. It should be appreciated that the proposed scheme applies to other digital content other than audio and video.

There are many similarities between audio signals and haptic signals. The haptic signal is encoded similar to that of an audio signal when using the variable haptic encoder in the discussion with respect to FIG. 7 above. In its current form, this allows the haptic signal to be supported by MP4, but also requires there to be enough distinction between the haptic and audio box structures to ensure that the haptic signal is not interpreted as an audio signal by standard MP4 players. Conversely, existing audio signals should not be mistaken for haptic signals.

The haptic signal may be encoded as AAC for convenience. This encoding is allowed to change due to various methods of providing an encoded haptic signal (data stream) as discussed above, but the box structure would be able to remain similar. The haptic signal needs a separate 'trak' box within the standard 'moov' box, alongside the other 'trak' boxes that exist for audio and video. Table I below lists the haptic box structure. MPEG4 Part-12 Standard (ISO/IEC 14496-12 Media File Format) (hereinafter referred to as the "Formats Standard") provides general information on the MP4 box hierarchy in Table I.

TABLE I

Box Hierarchy for Haptics

| Box Hierarchy | | | | | | | Description |
|---|---|---|---|---|---|---|---|
| moov | | | | | | | Container for all metadata |
| | trak | | | | | | Container for an individual track or stream |
| | | mdia | | | | | Container for the media information in a track |
| | | | mdhd | | | | Media header, overall information about the media |
| | | | hdlr | | | | Declares the media (handler) type |
| | | | minf | | | | Media information container |
| | | | | nmhd | | | Null media header |
| | | | | stbl | | | Sample Table Box |
| | | | | | stsd | | Sample Descriptions (codec types, initialization, etc.) |
| | | | | | | hapt | Haptic box, indicating this track as a haptic stream |
| | | | | | | Esds | Elementary Stream Description |

The haptic data should not be rendered as audio or video. Because most players will try to render any combination or number of video streams or any combination of audio streams specified by their respective 'trak' boxes, the haptic data should be denoted as a timed metadata track ('meta'). This may be done by setting the handler_type field to 'meta' in the 'hdlr' box.

Timed metadata tracks, specified in Section 8.4.3 in the Formats Standard, are for storing time-based media content. Storing the haptic signal in this type of track allows the stream to be considered media, but not of an audio or video format. In this case, specifying a timed metadata stream for haptic data is needed to ensure that during playback, the haptic data will not be rendered as audio, despite its original encoding being an audio format.

Figure 11:
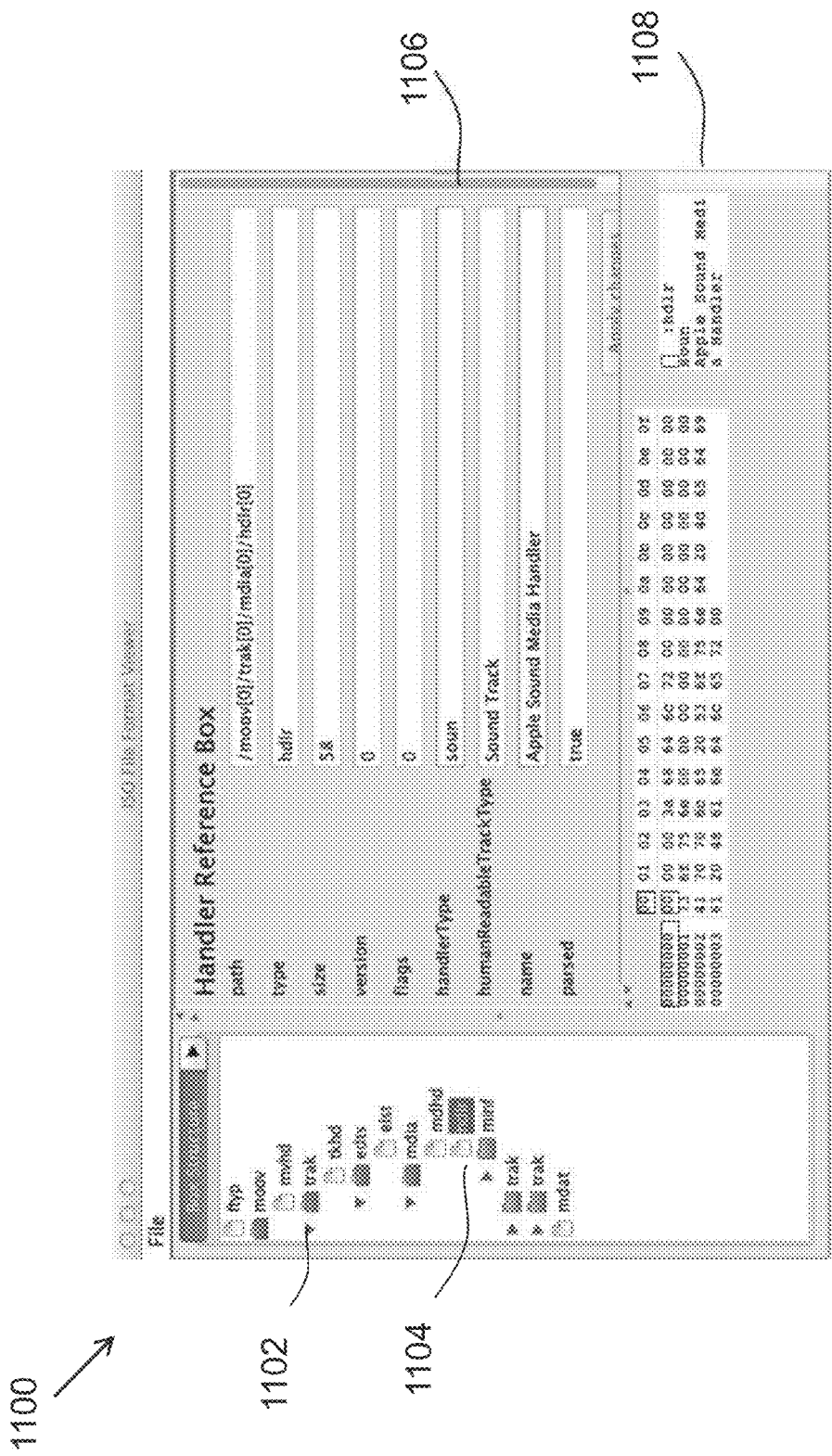
FIG. 11 illustrates an embodiment of a handler structure for audio data within an MP4 file.
Figure 12:
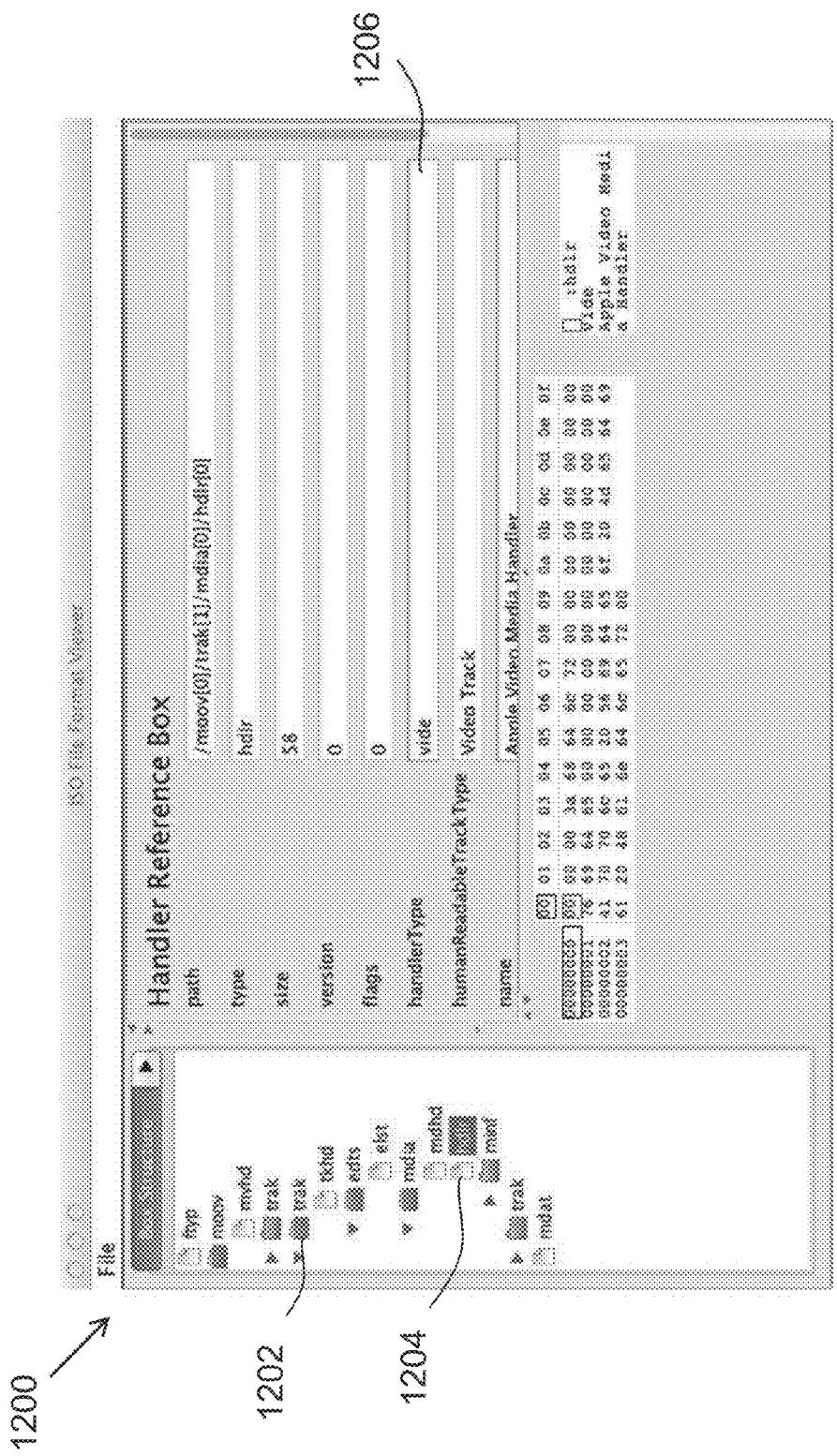
FIG. 12 illustrates an embodiment of a handler structure for video data within an MP4 file.
Figure 13:
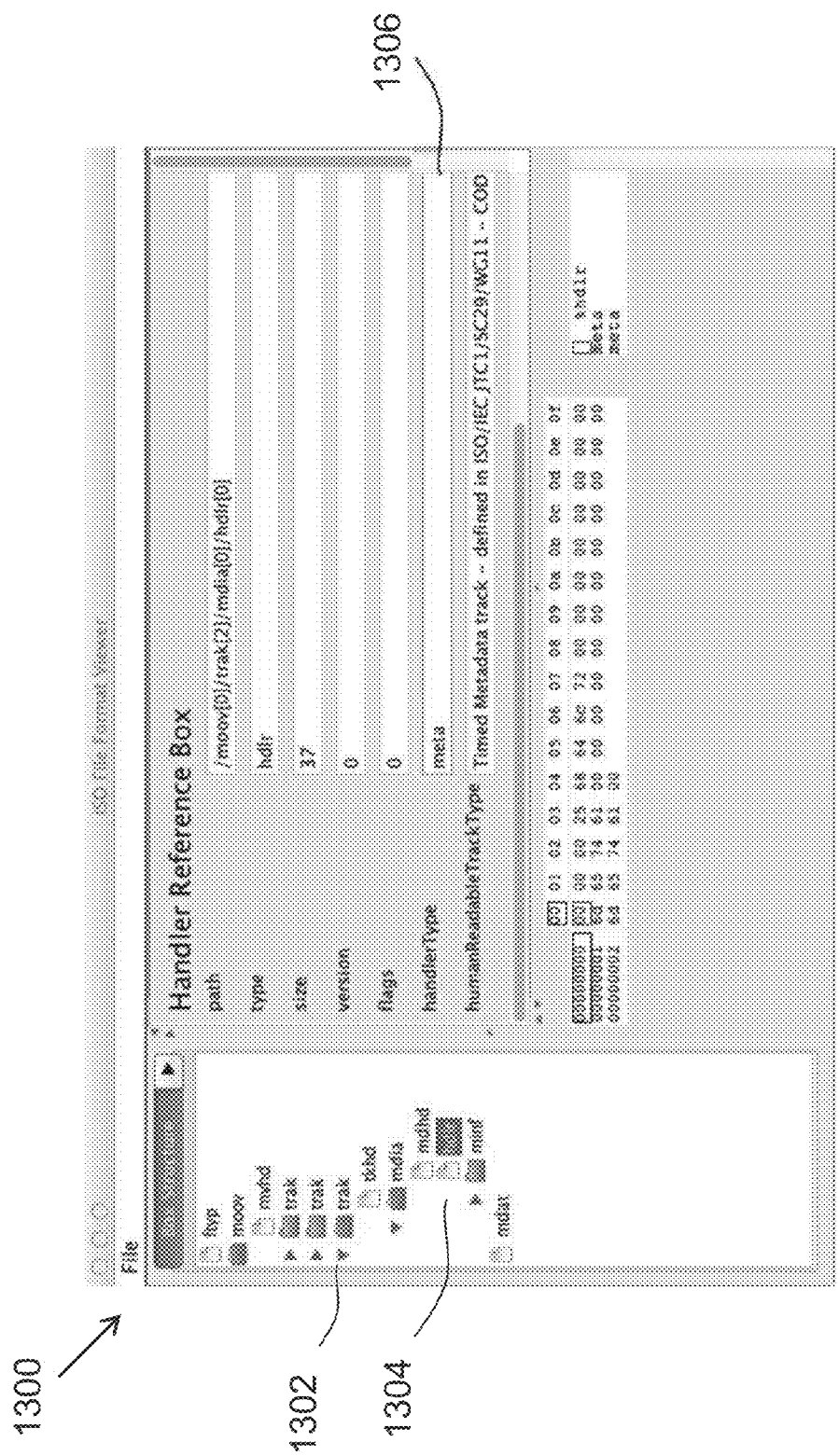
FIG. 13 illustrates an embodiment of a handler structure for haptic data within an MP4 file.

FIGS. 11-13 illustrate handler reference boxes for sound 1100, video 1200, and haptics 1300 and show how the sound, video, and haptic handler types differ when embedded together within an MP4 file. The handler_type for each 'trak' 1102, 1202, 1302 is specified in the 'hdlr' box 1104, 1204, 1304 as shown in FIGS. 11-13. The handler types for sound, video and timed metadata tracks, respectively, are 'soun' (1106 in FIG. 11), 'vide' (1206 in FIG. 12), and 'meta' (1306 in FIG. 13), as specified in Section 8.4.3 of the Formats Standard.

Figure 14:
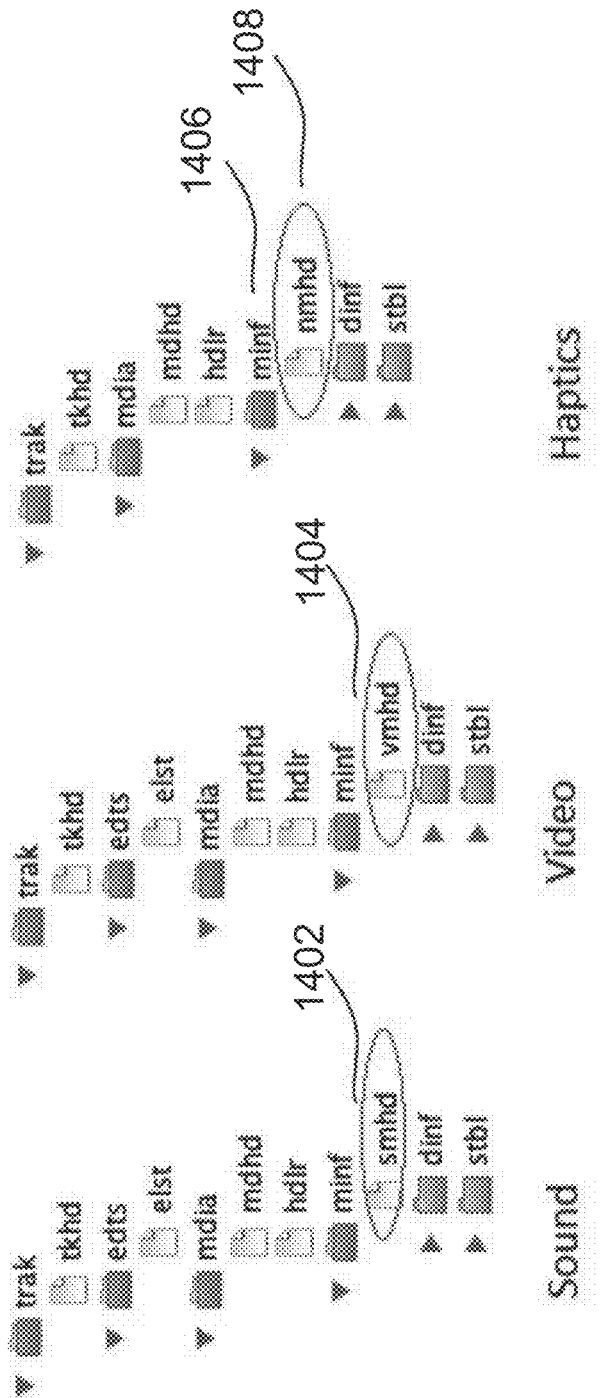
FIG. 14 illustrates an embodiment of audio, video and haptic data headers in an MP4 file.

Additionally, since the haptic stream is labeled as a timed metadata track, a null media header box (see 'nmhd') (1408 in FIG. 14) is under the 'minf' container box (1406 in FIG. 14), as specified under Section 8.4.5.5 in the Formats Standard. This indicates that the stream is not audio ('smhd'—sound media header) (1402 in FIG. 14) or video ('vmhd'—video media header) (1404 in FIG. 14), but may still be interpreted as a media stream. FIG. 14 illustrates this in more detail by showing the full box structures for sound, video, and haptics, respectively.

Further within the box structure, under 'stbl' (Sample Table Box) is the 'stsd' box, which is the Sample Description Box, as seen in Table I above. In this box, the format of the 'trak' is specified. For example, the first child box in 'stsd' is typically 'mp4a' for AAC audio tracks. For haptics, a new generic box with a four-character code ("FOURCC") value 'hapt' is created. This indicates that this timed metadata track contains information describing the haptic signal. According to Section 8.5.2.2 in the Formats Standard, the 'meta' handler type requires a meta data sample entry ("MetaDataSampleEntry") class to be implemented, but is defined as an empty class that may be extended by new subclasses. In an embodiment, this empty class is not extended with any additional information. Any haptic-specific information is stored in the 'esds' box, as seen in Table I and described below.

All timing information such as track duration and timescale should be present in 'mdhd' box to describe the overall duration and timescale of the haptic track. According to the MPEG4 Part-1 Standard (ISO/IEC 14496-1 Systems) (hereinafter referred to as the "Systems Standard"), timescale is a 32-bit unsigned integer that contains the number of time units which pass in one second. For example, if the haptic track has an update rate of 50 samples per second, this timescale is set to 50. The duration field is a 64-bit unsigned integer which declares the length of this haptic track in the scale of timescale. For example, if the timescale is set to 50, every sample has the length of 20 ms. If the haptic track is 5 seconds long, the duration field should have a value of 250 (5*1000/20).

As listed in Table I above, the only child box under the 'hapt' container box is the 'esds' box (Elementary Stream Description), also referred to as the ES_Descriptor. When applied to audio, this box contains information used to decode the stream associated with the 'trak' that it resides in. It may be used similarly with haptics. Syntax details on the 'esds' box are provided in Section 8.3.3.1 of the Systems Standard.

Figure 15:
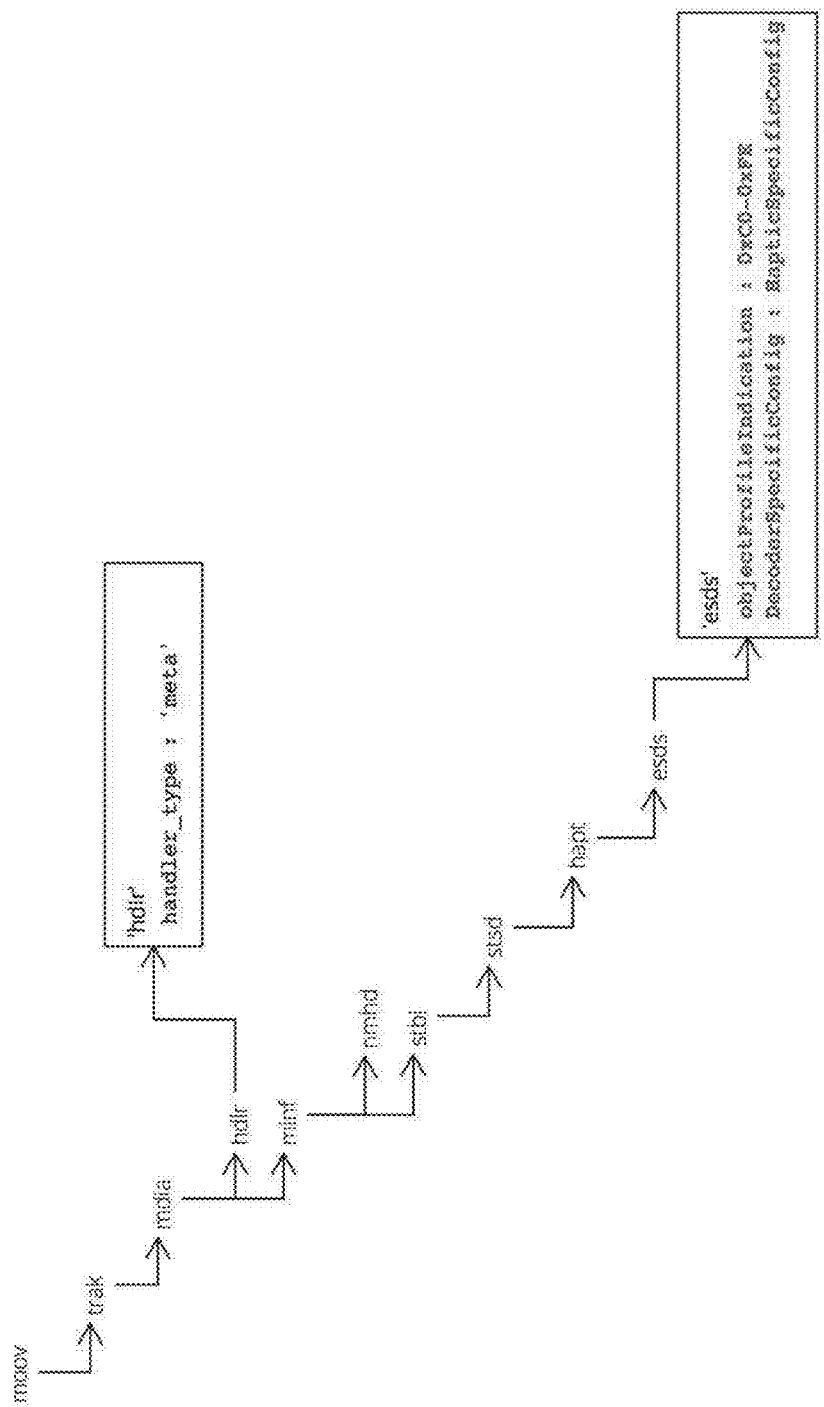
FIG. 15 illustrates an embodiment of a valid setting for haptic data in an MP4 file.

FIG. 15 illustrates an embodiment of a valid setting of an object profile indication ("objectProfileIndication") value for haptic data in an MP4 file. According to Section 8.3.3 of the Systems Standard, the ES_Descriptor box contains a decoder configuration descriptor ("DecoderConfigDescriptor") structure, which contains the parameters and requirements to parse and read the elementary stream. Within the DecoderConfigDescriptor, there are fields for the objectProfileIndication value and the decoder specific information ("DecoderSpecificInfo") structure.

The objectProfileIndication value provides the object profile type for the stream. This field is set to a value between 0xC0 and 0xFE, a range of user-private object profile types, which, when used within a 'hapt' box structure, will be known as a haptic type (see Table 8-5 of the Systems Standard).

The DecoderSpecificInfo structure is an abstract class that is extended by other classes, based on the objectProfileIndication value (see Table 8-5 of the Systems Standard). For one haptics implementation, this structure may be extended by the haptic specific configuration ("HapticSpecificConfig") class, which contains haptic-specific information such as the signal type and the actuator that the encoded signal was created for.

Figure 16:
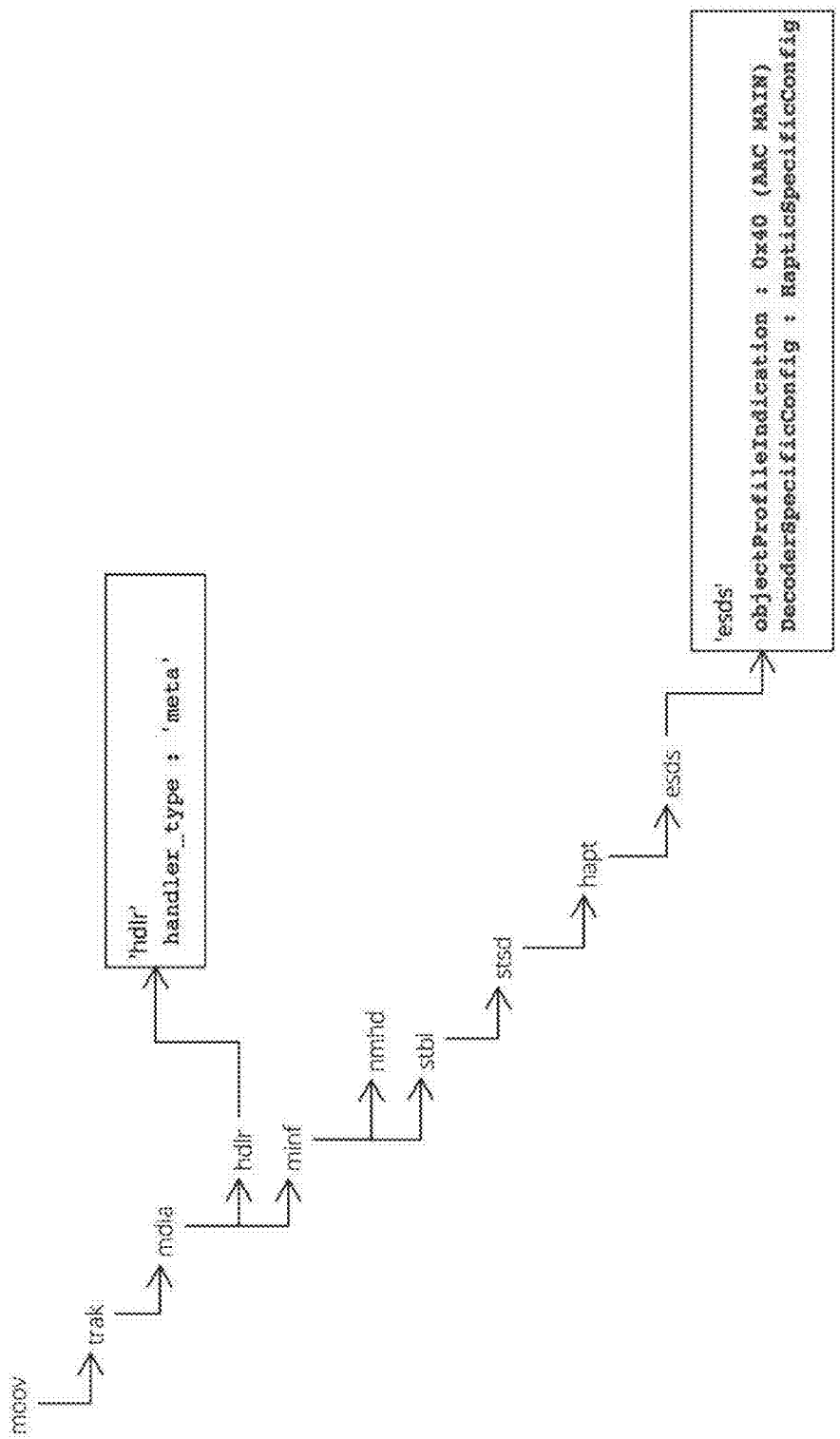
FIG. 16 illustrates an embodiment of an invalid setting for haptic data in an MP4 file.

To clarify, only 'trak' box structures that contain a 'hapt' box, using a value between 0xC0 and 0xFE as the object profile type will be considered valid haptic streams, as seen in FIG. 15. If the object profile type is of any other value, it will be considered invalid, as seen in FIG. 16, where the objectProfileIndication value is set to the AAC Main profile.

MPEG-4 systems generally expect configuration information in the elementary descriptor, which is needed for the decoding process. The DecoderConfigDescriptor must contain a subclass of the DecoderSpecificInfo abstract class as described in Section 8.3.3 of the Systems Standard. For audio streams, the DecoderSpecificInfo is extended by an audio-specific configuration ("AudioSpecificConfig") class, as described in Section 1.6.2.1 of the MPEG4 Part-3 Standard (ISO/IEC 14496-3 Audio) (hereinafter referred to as the "Audio Standard"). For haptic streams, the DecoderSpecificInfo is extended by a HapticSpecificConfig class as described herein.

HapticSpecificConfig extends the abstract class DecoderSpecificInfo, as defined in the System Standard, when the value of objectTypeIndication and streamType value are 0xC0 and 0x20 which indicate that this stream contains haptic information. Tables II-VIII below provide additional information that may be used for the syntax of HapticSpecificConfig, haptic stream type, sampling frequency, actuator configuration, channel configuration, endpoint configuration, and haptic decoder type.

TABLE II

Syntax of HapticSpecificConfig

| Syntax | No. of bits | Mnemonic |
|---|---|---|
| HapticSpecificConfig( ) | | |
| { | | |
|   hapticStreamType; | 2 | bslbf |
|   if ( hapticStreamType == 0x3) { | | |
|     audioObjectType; | 5 | bslbf |
|     channelConfiguration; | 4 | bslbf |
|   } | | |
|   else { | | |
|     hapticDecoderType; | 4 | bslbf |
|     actuatorConfiguration; | 4 | bslbf |
|   } | | |
|   samplingFrequencyIndex; | 4 | bslbf |
|   if ( samplingFrequencyIndex == 0xF ) { | | |
|     samplingFrequency; | 24 | uimsbf |
|   } | | |
|   EndpointConfiguration; | 8 | bslbf |
| } | | |

TABLE III

Haptic Stream Type

| Haptic Stream Type | Description |
|---|---|
| 0x0 | Reserved |
| 0x1 | Reserved |
| 0x2 | Haptic Encoded Stream |
| 0x3 | Audio Encoded Stream |

TABLE IV

Sampling Frequency Index

| Sampling Frequency Index | Value |
|---|---|
| 0x0 | 8000 |
| 0x1-0xE | Reserved |
| 0xF | Escape value |

TABLE V

Actuator Configuration

| Actuator Configuration | Description |
|---|---|
| 0x0 | Reserved |
| 0x1 | Single Actuator |
| 0x2-0xF | Reserved |

TABLE VI

Channel Configuration

| Value | Number of channels |
|---|---|
| 0 | — |
| 1 | Mono |

TABLE VII

Endpoint Configuration

| Endpoint Configuration | Description |
|---|---|
| 0x0 | Amplitude Modulation |
| 0x1-0xFF | Reserved |

TABLE VIII

Haptic Decoder Type

| Haptic Decoder Type | Description |
|---|---|
| 0x0 | Raw Stream |
| 0x1-0xF | Reserved |

The description above specifies the encoded haptic stream rather than the actual stream, itself. Typically, there is a stream associated with each 'trak' object that is of sound, video, or timed metadata types. These streams are interleaved in the 'mdat' box, which resides at the same level as the 'moov' box in the MP4 box structure. The 'mdat' box contains the actual data that the player parses, decodes, and renders on the end-platform. It is the responsibility of the formatting software to determine the segment sizes for each stream and to interleave all of the encoded segments of video, audio, and metadata (haptic) samples. In this case, the haptic signal may be extracted out of the interleaved data box by referencing the offsets to segments in the sample table, similar to how extraction is done for audio and video signals.

Various inputs, outputs, configurations, and/or other information described herein as being stored or storable may be stored in one or more databases. Such databases may be, include, or interface to, for example, an ORACLE™ relational database sold commercially by Oracle Corporation. Other databases, such as INFORMIX™, DB2 (Database 2) or other data storage, including file-based, or query formats, platforms, or resources such as OLAP (On Line Analytical Processing), SQL (Standard Query Language), a SAN (storage area network), MICROSOFT ACCESS™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

According to an aspect of the invention, there is provided a computer-implemented method for enriching user digital content experience with haptic data. The method is implemented on a computing device having a processor programmed with a computer program module. The method includes receiving digital content data including audio data and/or video data; generating haptic data using at least some of the received digital content data; encoding the generated haptic data for efficient transmission over a communication network; multiplexing the encoded haptic data with the received digital content data; embedding information for decoding the encoded haptic data in metadata of the multiplexed data stream; and sending the multiplexed data stream over the communication network.

According to an aspect of the invention, there is provided a computer-implemented method for transferring haptic data together with other digital content data over a network for an end user to experience the haptic effects generated on an end user device. The end user device is coupled to the network. The method is implemented on a computing device having a processor programmed with a computer program module. The method includes analyzing haptic data to determine at least one characteristic of the haptic data, and encoding, based on the determined characteristic, the haptic data to meet a pre-defined criteria.

According to an aspect of the invention, there is provided a computer-implemented method for enriching user digital content experience with haptic data. The method is implemented on a computing device having a processor programmed with a computer program module. The method includes receiving raw haptic data, encoding the received raw haptic data for a predetermined list of density factors to generate a list of encoded haptic data streams, each encoded haptic data stream corresponding to a density factor of the predetermined list of density factors, receiving network bandwidth information from an end user device over a communication network, selecting one of the encoded haptic data streams based on a corresponding density factor matching a condition of the communication network bandwidth, and transmitting the selected encoded haptic data stream to the end user device.

Other aspects, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method comprising:
receiving digital content data including audio data and/or video data;
generating haptic data using at least some of the received digital content data;
encoding by an encoder the haptic data for efficient transmission over a communication network;
multiplexing by a multiplexer the encoded haptic data with the received digital content data;
embedding information for decoding the encoded haptic data in metadata of the multiplexed data stream; and
sending the multiplexed data stream over the communication network.

2. The method of claim 1, further comprising:
analyzing the haptic data to determine at least one characteristic of the haptic data,
wherein said encoding the haptic data comprises encoding, based on the determined characteristic, the haptic data to meet a pre-defined criteria.

3. The method of claim 2, wherein the pre-defined criteria includes an output encoded haptic bit stream having the least number of bits.

4. The method of claim 2, further comprising:
receiving an endpoint configuration of an end user device from the end user device,
wherein the pre-defined criteria includes preserving a range of frequency of the haptic data that correspond to the received endpoint configuration of the end user device.

5. The method of claim 2, wherein said encoding the haptic data comprises selecting the encoder from a list of pre-determined encoders based on the determined characteristic and applying the selected encoder to transform the haptic data.

6. The method of claim 5, wherein the list of pre-determined encoders includes an Advanced Audio Coding encoder and/or a Free Lossless Audio encoder.

7. The method of claim 2, wherein the characteristics of the haptic data comprise one or more types of haptic output devices used to generate haptic effects based on the haptic data, intended use case of the haptic data, magnitude of the haptic data, frequency of the haptic data, and length of the silence in the haptic data.

8. The method of claim 7, wherein the types of haptic output devices include one or more of the group consisting of an eccentric rotating mass actuator, a linear resonant actuator, and a piezoelectric actuator.

9. The method of claim 7, wherein the intended use case of the haptic data is selected from the group consisting of music, movies and games.

10. The method of claim 2, wherein encoding the haptic data comprises:
applying each one of a list of pre-determined encoders to the haptic data to generate a corresponding list of encoded haptic data streams; and
selecting, using the pre-defined criteria, an encoded haptic data stream from the list of encoded haptic data streams.

11. The method of claim 1, wherein said encoding the haptic data comprises encoding the haptic data for a predetermined list of density factors to generate a plurality of encoded haptic data streams, each encoded haptic data stream corresponding to a density factor of the predetermined list of density factors, and wherein the method further comprises:

receiving network bandwidth information from an end user device over a communication network; and selecting one of the encoded haptic data streams based on a corresponding density factor matching a condition of the communication network bandwidth for multiplexing with the received digital content data.

12. The method of claim 11, wherein a first encoded data stream of the plurality of encoded data streams corresponds to a first density factor of the predetermined list of density factors, and a second encoded data stream of the plurality of encoded data streams corresponds to a second density factor of the predetermined list of density factors, and wherein the second encoded data stream comprises more haptic data than the first data stream and the second density factor is greater than the first density factor.

13. The method of claim 11, further comprising:
detecting a change in the network bandwidth information;
selecting a different one of the encoded haptic data streams based on the corresponding density factor matching the condition of the communication network bandwidth; and
transmitting the selected different one of the encoded data streams to the end user device.

14. A system comprising:
a processor configured to:
receive digital content data including audio data and/or video data,
generate haptic data using at least some of the received digital content data,
encode the haptic data using an encoder for efficient transmission over a communication network,
multiplex the encoded haptic data using a multiplexer with the received digital content data,
embed information for decoding the encoded haptic data in metadata of the multiplexed data stream; and
send the multiplexed data stream over the communication network; and
a user device configured to receive the multiplexed encoded haptic data and digital contact data over the communication network, the user device comprising a haptic output device configured to output a haptic effect based on the haptic data.

15. The system of claim 14, wherein the processor is further configured to analyze the haptic data to determine at least one characteristic of the haptic data, and encode the haptic data based on the determined characteristic to meet a pre-defined criteria.

16. The system of claim 15, wherein the pre-defined criteria includes an output encoded haptic bit stream having the least number of bits.

17. The system of claim 15, wherein the processor is further configured to receive an endpoint configuration of the user device from the user device, wherein the pre-defined criteria includes preserving a range of frequency of the haptic data that correspond to the received endpoint configuration of the end user device.

18. The system of claim 15, wherein the processor is further configured to select the encoder from a list of pre-determined encoders based on the determined characteristic and apply the selected encoder to transform the haptic data.

19. The system of claim 18, wherein the list of pre-determined encoders includes an Advanced Audio Coding encoder and/or a Free Lossless Audio encoder.

20. The system of claim 15, wherein the characteristics of the haptic data comprise one or more types of haptic output devices used to generate haptic effects based on the haptic data, intended use case of the haptic data, magnitude of the haptic data, frequency of the haptic data, and length of the silence in the haptic data.

21. The system of claim 20, wherein the types of haptic output devices include one or more of the group consisting of an eccentric rotating mass actuator, a linear resonant actuator, and a piezoelectric actuator.

22. The system of claim 20, wherein the intended use case of the haptic data is selected from the group consisting of music, movies and games.

23. The system of claim 15, wherein the processor is further configured to:
apply each one of a list of pre-determined encoders to the haptic data to generate a corresponding list of encoded haptic data streams; and
select, using the pre-defined criteria, an encoded haptic data stream from the list of encoded haptic data streams.

24. The system of claim 14, wherein the processor is further configured to encode the haptic data for a predetermined list of density factors to generate a plurality of encoded haptic data streams, each encoded haptic data stream corresponding to a density factor of the predetermined list of density factors;
receive network bandwidth information from an end user device over a communication network; and
select one of the encoded haptic data streams based on a corresponding density factor matching a condition of the communication network bandwidth to multiplex with the received digital content data.

25. The system of claim 24, wherein a first encoded data stream of the plurality of encoded data streams corresponds to a first density factor of the predetermined list of density factors, and a second encoded data stream of the plurality of encoded data streams corresponds to a second density factor of the predetermined list of density factors, and wherein the second encoded data stream comprises more haptic data than the first data stream and the second density factor is greater than the first density factor.

26. The system of claim 24, wherein the processor is further configured to:
detect a change in the network bandwidth information;
select a different one of the encoded haptic data streams based on the corresponding density factor matching the condition of the communication network bandwidth; and
transmit the selected different one of the encoded data streams to the end user device.

* * * * *